US009272682B2

(12) United States Patent
Wang et al.

(10) Patent No.: US 9,272,682 B2
(45) Date of Patent: Mar. 1, 2016

(54) WRAP AROUND SIDE IMPACT AIRBAG SYSTEMS AND METHODS

(71) Applicant: Autoliv ASP, Inc., Ogden, UT (US)

(72) Inventors: Xiaohong Wang, Roy, UT (US); Takayuki Makioka, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 46 days.

(21) Appl. No.: 14/091,224

(22) Filed: Nov. 26, 2013

(65) Prior Publication Data

US 2015/0145234 A1 May 28, 2015

(51) Int. Cl.
*B60R 21/232* (2011.01)
*B60R 21/233* (2006.01)
*B60R 21/2338* (2011.01)

(52) U.S. Cl.
CPC ..... *B60R 21/232* (2013.01); *B60R 2021/23316* (2013.01); *B60R 2021/23386* (2013.01); *Y10T 29/49622* (2015.01)

(58) Field of Classification Search
CPC .. B60R 21/231; B60R 21/232; B60R 21/233; B60R 21/23138; B60R 2021/23316; B60R 2021/23324; B60R 2021/0006; B60R 2021/0018
USPC .......................... 280/730.2, 729, 743.1, 730.1
See application file for complete search history.

(56) References Cited

U.S. PATENT DOCUMENTS

| 6,073,960 | A  | * | 6/2000  | Viano et al. ................ 280/730.1 |
|-----------|----|---|---------|----------------------------------------|
| 6,394,487 | B1 |   | 5/2002  | Heudorfer et al.                       |
| 6,705,640 | B2 |   | 3/2004  | Takahashi                              |
| 6,971,665 | B2 |   | 12/2005 | Tanaka                                 |
| 7,469,923 | B2 |   | 12/2008 | Ryan et al.                            |
| 7,658,402 | B2 | * | 2/2010  | Ohba ........................ 280/730.2 |
| 2013/0113192 | A1 |   | 5/2013  | Richards et al.                    |
| 2013/0134694 | A1 |   | 5/2013  | Matsushita et al.                  |
| 2013/0270805 | A1 | * | 10/2013 | Kruse et al. ................ 280/730.2 |

FOREIGN PATENT DOCUMENTS

JP 2008001197 1/2008

* cited by examiner

*Primary Examiner* — Keith Frisby
(74) *Attorney, Agent, or Firm* — Madson IP, P.C.

(57) ABSTRACT

An airbag assembly may include an inflatable curtain airbag with a stowed configuration and a deployed configuration. The inflatable curtain may have a first chamber and a second chamber that inflates forward of the first chamber. The second chamber may be separated from the first chamber by a non-inflating region. The non-inflating region may have a width selected such that in-plane bending of the inflatable curtain occurs during deployment. The in-plane bending may position the second chamber lower than the first chamber such that the second chamber overlaps a significant portion of a door adjacent to the inflatable curtain. Forward and rearward portions of the non-inflating region may be attached together to form a fold that decreases the width of the non-inflating region, thereby enhancing the in-plane bending. The second chamber may also bend out-of-plane relative to the first chamber to help provide protection in small overlap collision situations.

13 Claims, 13 Drawing Sheets

WRAP AROUND SIDE IMPACT AIRBAG SYSTEMS AND METHODS

TECHNICAL FIELD

The present invention relates to automotive safety. More specifically, the present invention relates to an inflatable airbag curtain and method that provide protection in small overlap and oblique frontal collisions and side collision situations.

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of the driver and passenger to protect them from harmful impact with the interior of the car. Typically, airbags are concealed within the vehicle trim to be invisible during normal vehicle operation.

Airbag systems have also been developed in response to the need for similar protection from lateral impacts between a passenger and the side of a vehicle's interior. This might occur when another vehicle collides with the side of the car, or in a rollover situation where the side of car is repeatedly impacting the ground. Side impact airbags are often called "inflatable curtains." Many inflatable curtains are stowed along the corner where the vehicle roof meets the side windows and pillars. These inflatable curtains may be stowed behind the headliner trim at the edge of the headliner, which is the fabric covering the roof of the vehicle.

Recent safety standards issued by various governments require more comprehensive protection in the event of a side or frontal collision. Additionally, there is an ongoing need to provide airbag systems that are economical to manufacture and install, avoid interference with the ability of the automaker to position various features on the vehicle interior, and can be expected to deploy reliably. The passengers of a vehicle may be at any of a wide variety of positions within the vehicle at the time of deployment, so it is desirable to provide airbag systems that protect against impact over the broadest possible range of occupant locations.

It has been observed that some existing inflatable curtain designs do not provide adequate protection in the event of certain collision events, such as rollover collisions. In a rollover collision, the position and trajectory of vehicle occupants is difficult to predict. Accordingly, known inflatable curtains designed to protect against a pure lateral impact may not be in the proper position to provide the protection that is most needed. The result may be injuries from impact with interior vehicle surfaces and/or ejection from the vehicle, despite deployment of the airbag systems.

Additionally, one safety need that has recently become apparent is the need for enhanced protection in the event of "small overlap" and "oblique" collisions. A small overlap collision is a frontal collision in which the impact occurs on a relatively narrow portion on the left or right side of the front of the vehicle. An oblique collision is a frontal collision in which the impact occurs at an angle from head-on and on a relatively narrow portion on the left or right side of the front of the vehicle. Such collisions may lead to greater deformation of the vehicle structure on the side on which the impact occurs. Also, such collisions tend to cause the center of the vehicle to rotate away from the line of travel which can cause the vehicle occupant to move in a forward outboard trajectory. Additionally, existing airbag systems may not sufficiently protect against small overlap and oblique collisions because the trajectory of the occupants within the vehicle may be different from those for which the airbag systems are designed to provide protection. For example, in a vehicle with a driver's side airbag and an inflatable curtain airbag, the driver's head may move forward with a vector that has forward and lateral components so that the head tends to move between the deployed driver's side airbag and the deployed inflatable curtain airbag. This may cause the driver's head to strike the A-pillar or the instrument panel of the vehicle in spite of the deployment of the airbag systems.

Additionally, it is desirable to reduce the cost, complexity, and manufacturing time of airbags. Simpler, cheaper airbag systems may not only save consumers money, but may also extend the availability of airbag systems to vehicle occupants who may otherwise be under-protected in the event of an automotive collision.

SUMMARY OF THE INVENTION

The various systems and methods of the present invention have been developed in response to the present state of the art, and in particular, in response to the problems and needs in the art that have not yet been fully solved by currently available airbag systems and methods. Thus, it is advantageous to provide airbag systems and methods that provide reliable protection for vehicle occupants in a wide variety of collision situations. Further, it is advantageous to minimize manufacturing and installation costs. The present invention may have other benefits that are not specifically set forth herein.

To achieve the foregoing, and in accordance with the invention as embodied and broadly described herein, an airbag assembly may be disposed in a vehicle to shield a vehicle occupant from impacting at least one lateral surface of the vehicle. The airbag assembly may include an inflatable curtain airbag having a stowed configuration proximate the roof of the vehicle and a deployed configuration into which the inflatable curtain airbag deploys downward between the vehicle occupant and the at least one lateral surface of the vehicle. The inflatable curtain airbag may have an inboard fabric layer and an outboard fabric layer that are secured together at a peripheral juncture to define, interior to the peripheral juncture, a first chamber, a second chamber in fluid communication with the first chamber, and a non-inflating region extending from the peripheral juncture to at least partially separate the first chamber from the second chamber. The non-inflating region may have a width selected to permit in-plane bending of the inflatable curtain airbag in the deployed configuration.

The non-inflating region may have a generally vertical portion that extends upward from a bottom edge of the peripheral juncture between the first chamber and the second chamber. In the deployed configuration, the in-plane bending of the inflatable curtain airbag may cause the second chamber to be angled downward relative to the first chamber. The non-inflating region may further have a generally horizontal portion that extends forward of the generally vertical portion to divide the second chamber into an upper segment and a lower segment. In the deployed configuration, the second chamber may inflate inboard of a window, and the lower segment may extend significantly lower than a bottom of the window and lower than the first chamber.

The second chamber may further have a forward segment. The upper segment, the forward segment, and the lower segment may cooperate to define a single non-branching passageway that conducts inflation gas from the first chamber to the upper segment, from the upper segment to the forward segment, and from the forward segment to the lower segment. In the deployed configuration, the lower segment may be angled such that on the lower segment, an exterior surface of the inboard fabric layer faces upward.

The width of the non-inflating region may be between 7 mm and 20 mm. In the deployed configuration, the second chamber may be positioned between an occupant zone that would ordinarily be occupied by the vehicle occupant's head and at least one of an A-pillar of the vehicle and a portion of an instrument panel of the vehicle.

The airbag assembly may further have a tether with a first end securable to the second chamber and a second end securable to the vehicle to urge the inflatable curtain airbag to fold out-of-plane, in the deployed configuration, at the non-inflating region to position the second chamber inboard of the first chamber. The airbag assembly may also have an attachment feature that attaches a forward portion of the non-inflating region to a rearward portion of the non-inflating region such that a compaction feature is defined between the forward portion and the rearward portion to compress the width of the non-inflating region. The compaction feature may be selected from the group consisting of a fold and a cut. The attachment feature may be stitching applied to the forward portion and the rearward portion.

According to one method for manufacturing an airbag assembly for protecting a vehicle occupant from impact against a lateral surface of the vehicle, the method my include providing an inboard fabric layer and an outboard fabric layer, securing the inboard fabric layer to the outboard fabric layer at a peripheral juncture to form an inflatable airbag curtain, and compacting the inflatable curtain airbag into a generally elongated shape. The generally elongated shape may facilitate securement of the inflatable curtain airbag proximate a roof of the vehicle such that, in response to introduction of inflation gas into the inflatable curtain airbag, the inflatable curtain airbag expands downward into a deployed configuration to be positioned between the vehicle occupant and the lateral surface of the vehicle. Securing the inboard fabric layer to the outboard fabric layer may include defining, interior to the peripheral juncture, a first chamber, a second chamber in fluid communication with the first chamber, and a non-inflating region extending from the peripheral juncture to at least partially separate the first chamber from the second chamber. The non-inflating region may have a width selected such that, during deployment, the inflatable curtain airbag folds in-plane.

Defining the non-inflating region may include forming a generally vertical portion that extends upward from a bottom edge of the peripheral juncture between the first chamber and the second chamber. The width may further be selected such that, in the deployed configuration, the in-plane bending of the inflatable curtain airbag causes the second chamber to be angled downward relative to the first chamber. The second chamber may inflate inboard of a window, and the second chamber may extend significantly lower than a bottom of the window.

Defining the non-inflating region may further include forming a generally horizontal portion that extends forward of the generally vertical portion to divide the second chamber into an upper segment, a forward segment, and a lower segment. These segments may cooperate to define a single non-branching passageway that conducts the inflation gas from the first chamber to the upper segment, from the upper segment to the forward segment, and from the forward segment to the lower segment. Compacting the inflatable curtain airbag into the generally elongated shape may include facilitating securement of the inflatable curtain airbag at a position selected such that, in the deployed configuration, the second chamber is positioned between an occupant zone that would ordinarily be occupied by the vehicle occupant's head and at least one of an A-pillar of the vehicle and a portion of an instrument panel of the vehicle.

The method may further include attaching a forward portion of the non-inflating region to a rearward portion of the non-inflating region with an attachment feature such that a fold is defined between the forward portion and the rearward portion to compress the width of the non-inflating region. The attachment feature may include stitching. Attaching the forward portion of the non-inflating region to the rearward portion of the non-inflating region may include stitching the forward portion to the rearward portion.

According to one embodiment of the invention, an airbag assembly may be provided for disposition proximate a roof of a vehicle to shield a vehicle occupant from impacting at least one lateral surface of the vehicle. The airbag assembly may include an inflatable curtain airbag having a stowed configuration proximate the roof of the vehicle and a deployed configuration into which the inflatable curtain airbag deploys downward between the vehicle occupant and the at least one lateral surface of the vehicle. The inflatable curtain airbag may have an inboard fabric layer and an outboard fabric layer that are secured together at a peripheral juncture to define, interior to the peripheral juncture, a first chamber, and a second chamber in fluid communication with the first chamber. The second chamber may have a single non-branching passageway that includes an upper segment through which inflation gas enters the second chamber from the first chamber, and a lower segment below the upper segment and adjacent to a bottom edge of the peripheral juncture. The lower segment may direct the inflation gas back toward the first chamber.

The inboard fabric layer and the outboard fabric layer may further be secured together to define a non-inflating region with a generally vertical portion that extends upward from a bottom edge of the peripheral juncture to at least partially separate the first chamber from the second chamber, and a generally horizontal portion that separates the upper segment from the lower segment. The single unbranching pathway may further have a forward segment positioned to convey the inflation gas downward from the upper segment to the lower segment.

The inboard fabric layer and the outboard fabric layer may further be secured together to define a non-inflating region with a generally vertical portion that extends upward from a bottom edge of the peripheral juncture to at least partially separate the first chamber from the second chamber, and a generally horizontal portion that separates the upper segment from the lower segment. The non-inflating region may have a width selected to permit in-plane bending of the inflatable curtain airbag in the deployed configuration. The in-plane bending of the inflatable curtain airbag may cause the second chamber to be angled downward relative to the first chamber such that the second chamber inflates inboard of a window. The lower segment may extend significantly lower than a bottom of the window.

The inboard fabric layer and the outboard fabric layer may further be secured together to define a non-inflating region with a generally vertical portion that extends upward from a bottom edge of the peripheral juncture to at least partially separate the first chamber from the second chamber, and a generally horizontal portion that separates the upper segment from the lower segment. The airbag assembly may further have an attachment feature that attaches a forward portion of the non-inflating region to a rearward portion of the non-inflating region such that a fold is defined between the forward portion and the rearward portion to reduce a width of the non-inflating region.

These and other features and advantages of the present invention will become more fully apparent from the following description and appended claims, or may be learned by the practice of the invention as set forth hereinafter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Exemplary embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the apparatus, system, and method of the present invention, as represented in FIGS. 1 through 12, is not intended to limit the scope of the invention, as claimed, but is merely representative of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature. "Exemplary" as used herein means serving as a typical or representative example or instance, and does not necessarily mean special or preferred.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Figure 1:
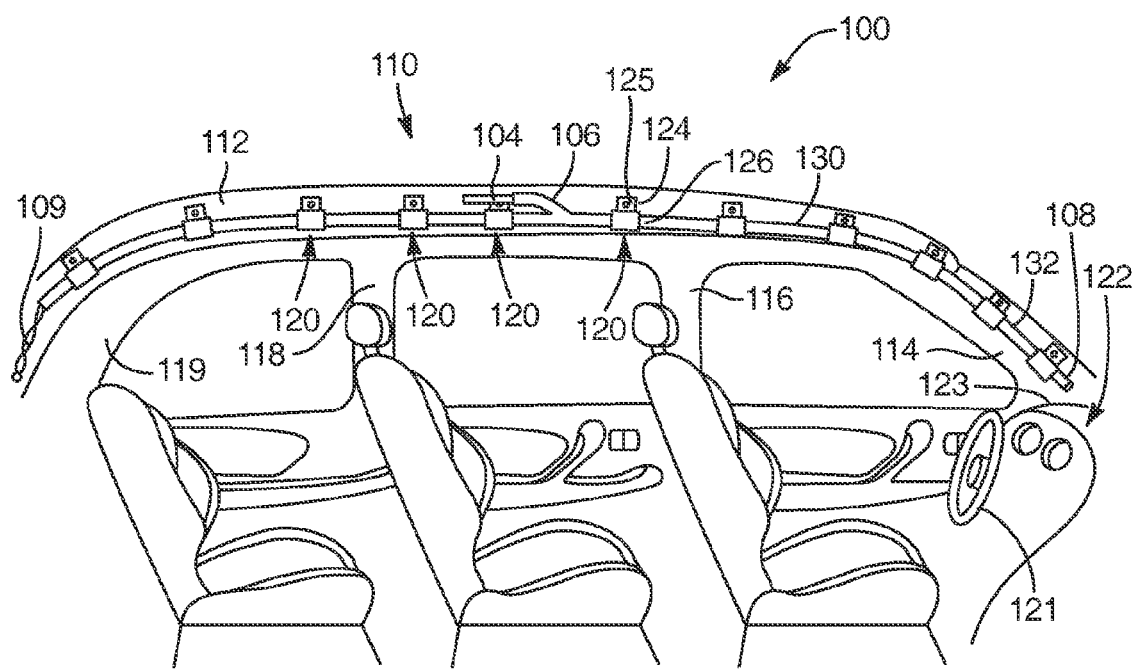
FIG. 1 is a side elevation view of an airbag assembly in a stowed configuration within a vehicle according to one exemplary embodiment of the invention.
Figure 1:
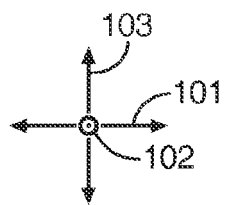

Referring to FIG. 1, an airbag assembly 100 may be used to protect the passengers of a vehicle during a side collision or roll-over collision. The vehicle may have a longitudinal direction 101 oriented along the length of the vehicle, a lateral direction 102 oriented from one side of the vehicle to the opposing side, e.g., into and out of the page in the view of FIG. 1, and a transverse direction 103 oriented upward and downward. The terms "inboard" and "outboard" may be used to refer to the position of an object along the lateral direction 102. "Outboard" relates to placement of an object relatively closer than a second object to a lateral plane of the vehicle, which is either of two planes perpendicular to the lateral direction 102, one of which barely touches the very leftward terminus of the vehicle, and the other of which barely touches the very rightward terminus of the vehicle. "Inboard" relates to placement of an object relatively closer than a second object to a medial plane of the vehicle, which is the plane perpendicular to the lateral direction 102 that bisects the vehicle into two equal halves. "Inboard" and "outboard" do not require alignment of the two objects in the lateral direction 102; rather, these terms simply relate to proximity to the lateral or medial planes as set forth above.

The terms "rearward" and "forward" relate to the relative positions of the objects along the longitudinal direction 101. "Forward" relates to placement of an object relatively closer than a second object to a frontal plane of the vehicle, which is a plane perpendicular to the longitudinal direction 101 that barely touches the very frontward terminus of the vehicle. Similarly, "rearward" relates to placement of an object relatively closer than another object to a rear plane of the vehicle, which is a plane perpendicular to the longitudinal direction 101 that barely touches the very rearward terminus of the vehicle. An object that is "forward" of a second object need not be aligned with the second object in the longitudinal direction 101; it simply means that the first object is closer to the frontal plane of the vehicle than the second object. The term "rearward" similarly does not require alignment in the longitudinal direction 101.

The term "lateral" refers to a direction, object, or surface that pertains to the lateral direction 102. The "lateral surfaces" of the vehicle are the interior surfaces of the vehicle that face generally (but not necessarily precisely) toward the medial plane of the vehicle.

The airbag assembly 100 may include an inflator 104, a tube 106, and an inflatable curtain airbag 110 that receives gas from the inflator 104 via the tube 106. The airbag assembly 100 may also have a sensor and a control system (not shown) that detects a collision or impending collision and transmits an activation signal to the inflator 104. The inflator 104 may be one of several types, such as pyrotechnic, stored gas, or a combination inflator and may be a single or multistage inflator. The inflator 104 may be stored at any suitable location relative to the inflatable curtain airbag 110. If the inflator 104 is a pyrotechnic inflator, the inflator 104 may contain a propellant that ignites to rapidly produce inflation gas in response to receipt of the activation signal.

The inflatable curtain airbag 110 may extend along the longitudinal direction 101 within the vehicle. The inflatable curtain airbag 110 may be coupled to or next to a roof rail 112 of the vehicle. The airbag assembly 100 may also include a forward tether 108 and a rear tether 109 that are coupled proximate the front and rear ends, respectively, of the inflatable curtain airbag 110. Upon inflation of the inflatable curtain airbag 110, the forward tether 108 and the rear tether 109 may provide tension that helps keep the inflatable curtain airbag 110 in place.

In the event of a collision, the inflatable curtain airbag 110 may expand downward along the side of the vehicle between the vehicle passengers and one or more lateral surfaces of the vehicle such as the side windows and pillars (the structures between the lateral windows and/or the windshield and rear window) of the vehicle. The pillars may include an A-pillar 114, a B-pillar 116, a C-pillar 118, and, if present, a D-pillar 119, all of which may join the roof rail at their upper ends. In some embodiments, an inflatable curtain airbag may extend from an A-pillar to a C-pillar of the vehicle. In other embodiments such as that illustrated in FIG. 1, the inflatable curtain airbag 110 may extend from the A-pillar 114 to a D-pillar 119 of the vehicle.

In addition to the airbag assembly 100, other airbags may be installed in the vehicle. For example, a separate driver's side airbag (not shown in FIG. 1) may be used to protect an occupant (i.e., the driver) from impact with various forward surfaces of the vehicle, including the steering wheel 121 and instrument panel 122. The airbag assembly 100 may provide supplemental protection by cushioning impact not only against the lateral surfaces mentioned previously, but also cushioning impact against the A-pillar and/or an outboard portion 123 of the instrument panel 122. The outboard portion 123 is the portion of the instrument panel 122 that lies generally outboard of the steering wheel 121.

The inflatable curtain airbag 110 may normally reside in a stowed configuration, in which the inflatable curtain airbag 110 is concealed behind the interior trim of the vehicle, such as the lateral headliner trim (the trim that covers the edges of the headliner, which is typically a sheet of fabric that covers the interior of the vehicle roof). Prior to installation in the vehicle, the inflatable curtain airbag 110 may be compacted into the stowed configuration, such as by rolling, folding, or a combination thereof, such that the inflatable curtain airbag 110 assumes an elongated shape extending along a pathway with a length that is much greater than the height or width of its cross-sectional shape.

Once compacted into the stowed configuration, the inflatable curtain airbag 110 may be retained in the stowed configuration through the use of wrappers, fasteners, or the like to facilitate shipping and installation. The inflatable curtain airbag 110 may be secured to the vehicle proximate the roof rail 112. In the embodiment of FIG. 1, integrated wrappers and fastening systems may be provided in the form of a plurality of mounting assemblies 120 distributed along the length of the inflatable curtain airbag 110. Each of the mounting assemblies 120 may include a tab 124 secured to the inflatable curtain airbag 110, a fastener 125 that secures the tab 124 to the roof rail 112, and a wrapper 126 that encircles the inflatable curtain airbag 110 to keep the inflatable curtain airbag 110 in the stowed configuration until deployment.

In alternative embodiments, different mounting assemblies may be used. Such mounting assemblies may include tabs that are integrally formed with the inflatable curtain airbag, alternative fasteners, or the like. The wrappers 126 may not be present in all embodiments; other embodiments may utilize different features or attachment methods to keep the inflatable curtain airbag compacted. Such wrappers or other features may be independent of the mounting assemblies used to secure the inflatable curtain airbag to the vehicle.

As shown, the inflatable curtain airbag 110 may have a first protection zone 130 secured to the roof rail 112 and a second protection zone 132 secured to the pillar 114. Thus, the mounting assemblies 120 may be arranged along the length of the inflatable curtain airbag 110 from a rear location on or near the D-pillar to a forward location proximate a forward end of the A-pillar 114.

Upon activation, the inflator 104 may generate and/or release inflation gas into the tube 106. From the tube 106, the inflation gas may rapidly enter the inflatable curtain airbag 110, thereby causing the inflatable curtain airbag 110 to begin expanding. In response to the expansion, the wrappers 126 may break to release the inflatable curtain airbag 110. Thus, the inflatable curtain airbag 110 may exit the stowed configuration and assume an extended shape. This process is called "deployment." When deployment is complete, the inflatable curtain airbag 110 may be said to be in a deployed configuration, as will be shown and described in FIG. 2.

Figure 2:
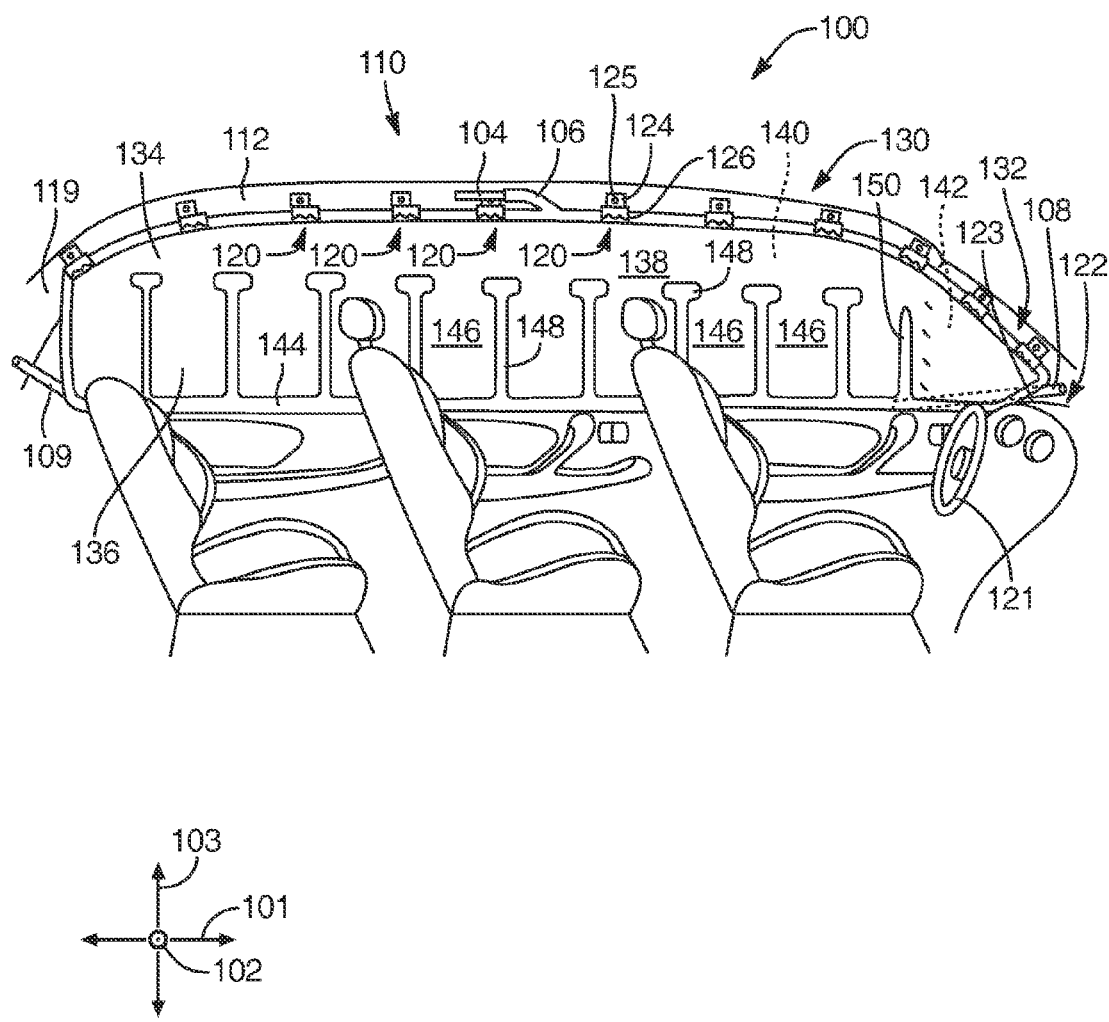
FIG. 2 is a side elevation view of the airbag assembly of FIG. 1, wherein the inflatable curtain airbag is in a deployed configuration.

Referring to FIG. 2, a perspective view illustrates the airbag assembly 100, wherein the inflatable curtain airbag 110 is in the deployed configuration. The inflatable curtain airbag 110 may inflate upon activation of the inflator 104 and/or other optional inflators such that the inflatable curtain airbag 110 transitions from the stowed configuration to the deployed configuration. During deployment, the wrapper 126 may tear such that inflatable curtain airbag 110 can exit the stowed configuration. The inflatable curtain airbag 110 may also extend past a B-pillar 116 and a C-pillar 118 such that in a deployed configuration, the inflatable curtain airbag at least partially covers the B-pillar 116 and the C-pillar 118, as depicted in FIG. 2. The inflatable curtain airbag 110 may also cover a portion of the D-pillar 119.

FIG. 2 illustrates the positioning of the first protection zone 130 and the second protection zone 132. The first protection zone 130 may generally cover the lateral surfaces of the vehicle from the steering wheel rearward, while the second protection zone 132 covers the lateral surfaces forward of the steering wheel. The inflatable curtain airbag 110 may have an upper portion 134 and a lower portion 136.

Figure 3:
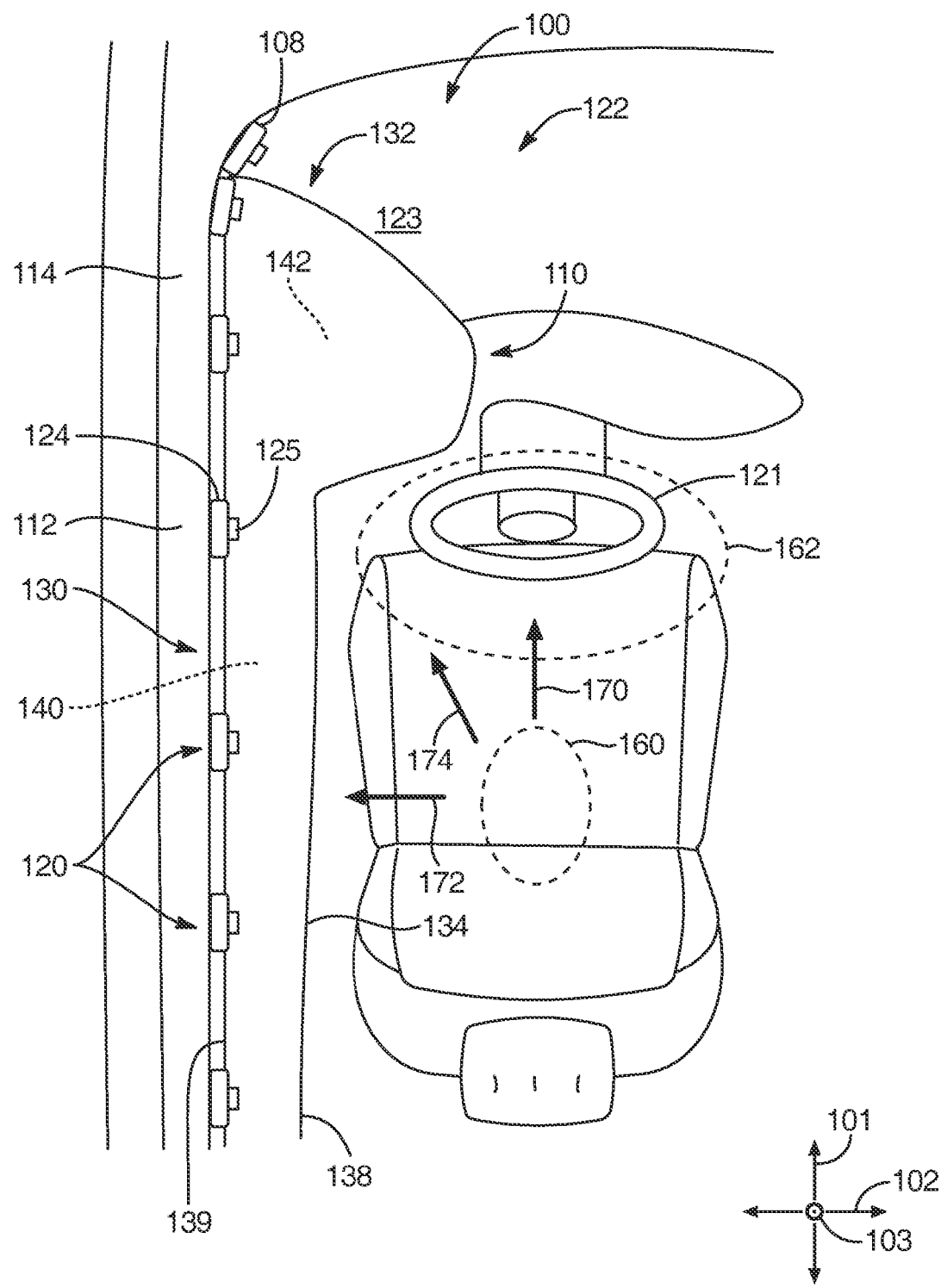
FIG. 3 is a top view of the airbag assembly of FIG. 1, wherein the inflatable curtain airbag is in the deployed configuration.

The inflatable curtain airbag 110 may be generally formed from two layers of flexible material such as a fabric or thin polymer, and may include an inboard section 138, and an outboard fabric layer in the form of an outboard section 139 (visible in FIG. 3). The inboard section 138 and the outboard section 139 may constitute a first fabric layer and a second fabric layer, respectively. According to one example, the inflatable curtain airbag 110 is generally made from a woven nylon fabric, but other fabrics or flexible materials may be used. The inboard section 138 and the outboard section 139 may be separate pieces of fabric, or may be sections of a single piece of fabric folded together. The inboard section 138 and the outboard section 139 may be secured together at a peripheral juncture, for example, via peripheral stitching 144, as shown. In the alternative, the inboard section 138 and the outboard section 139 may be secured together via mechanical fastening, adhesives, one-piece weaving, RF welding, ultrasonic welding, or any other suitable method known in the art.

The inboard section 138 and the outboard section 139 of the inflatable curtain airbag 110 may define a first chamber 140 within the first protection zone 130 and a second chamber 142 within the second protection zone 132. A "chamber" may be defined as an interior cavity within a body. The first chamber 140 may receive inflation gas from the inflator 104 via the fill tube 106. The second chamber 142 may receive inflation gas from the first chamber 140. As shown, the first chamber 140 may be divided into inflation cells 146 via interior stitching 148.

Referring to FIG. 3, a top view illustrates the airbag assembly 100 with the inflatable curtain airbag 110 in the deployed configuration. Additionally, FIG. 3 illustrates an occupant zone 160 that would ordinarily be occupied by a vehicle occupant's head, or more specifically, the driver's head, along with a deployed position 162 of an exemplary driver's side airbag.

Additionally, FIG. 3 shows a forward trajectory 170, an outboard trajectory 172, and a forward outboard trajectory 174 of the occupant's head relative to the vehicle. The forward trajectory 170 is where the head may move from the occupant zone 160 during an ordinary (i.e., not small overlap or oblique) frontal collision. The outboard trajectory 172 is where the head may move from the occupant zone 160 during a side impact, such as an impact against the side of the vehicle along which the inflatable curtain airbag 110 inflates. The forward outboard trajectory 174 is where the head may move from the occupant zone 160 during a small overlap or oblique collision.

As shown, the forward outboard trajectory 174 results from a rotation of the vehicle caused by the small overlap or oblique collision and may tend to move the occupant's head outboard of the steering wheel 121 to impact the A-pillar 114 and/or the outboard portion 123 of the instrument panel 122. Some vehicles may have doors that extend forward of the steering wheel 121, and accordingly, may have door trim or other door portions that may also be impacted in the event of a small overlap or oblique collision. The presence of the second protection zone 132 may serve to protect the head from such an impact. Thus, the second protection zone 132 may enable the airbag assembly 100 to provide enhanced protection in the event of a rollover or small overlap or oblique collision.

Depending on the layout of the interior stitching 148, the second protection zone 132 may inflate generally simultaneously with the first protection zone 130, or may only inflate after inflation of the first protection zone 130 has substantially completed. If the interior stitching 148, or more specifically, a chamber divider 150 of the interior stitching 148, is positioned to restrict inflation gas flow from the first protection zone 130 into the second protection zone 132, inflation of the second protection zone 132 may be delayed to the extent desired.

The second protection zone 132 may interact with the various interior structures of the vehicle, such as the A-pillar 114, the instrument panel 122, and the steering wheel 121. For example, the second protection zone 132 may butt up against any of these structures during deployment to provide some frictional engagement that helps the second protection zone 132 to remain in place during the potential impact of the occupant's head with the second protection zone 132.

The airbag assembly 100 is shown in use on the driver's side of the vehicle. A similarly configured (i.e., mirror image or near-mirror image) airbag assembly may be used on the passenger's side of the vehicle in addition or in the alternative to the airbag assembly 100. Such an airbag assembly may have a second protection zone similar to the second protection zone 132 to protect the front passenger from impact against the interior surfaces that correspond to the A-pillar 114, the steering wheel 121, and the outboard portion 123 of the instrument panel 122. For example, the passenger's side may have an A-pillar, glove compartment, dashboard, and/or instrument panel that may be beneficially covered by such a second protection zone.

The configuration of the airbag assembly 100 is merely exemplary. A variety of types and configurations of inflatable curtain airbags may be utilized within the scope of the present disclosure. For example, in alternative embodiments, varying sizes, shapes, and proportions of inflatable curtain airbags may be used. An automaker may select from such alternative embodiments based on the desired location within the vehicle, the anticipated collision type and severity, the likely habits of vehicle occupants, and any other criteria recognized by those of skill in the automotive safety arts.

In the embodiment of FIGS. 1-3, the second protection zone 132 may generally be stowed within the trim attached to the A-pillar 114. This may be suitable for some vehicles. However, in some embodiments, it may be desirable to minimize the airbag structure stowed on and/or secured to the A-pillar 114. Some vehicles, and in particular, compact cars, may have very limited space within the trim attached to the A-pillar 114. Additionally, it may be desirable to minimize the risk that any A-pillar trim elements or other components will be projected into the vehicle interior during deployment. Hence, in alternative embodiments, a second protection zone may be stored elsewhere.

Figure 4:
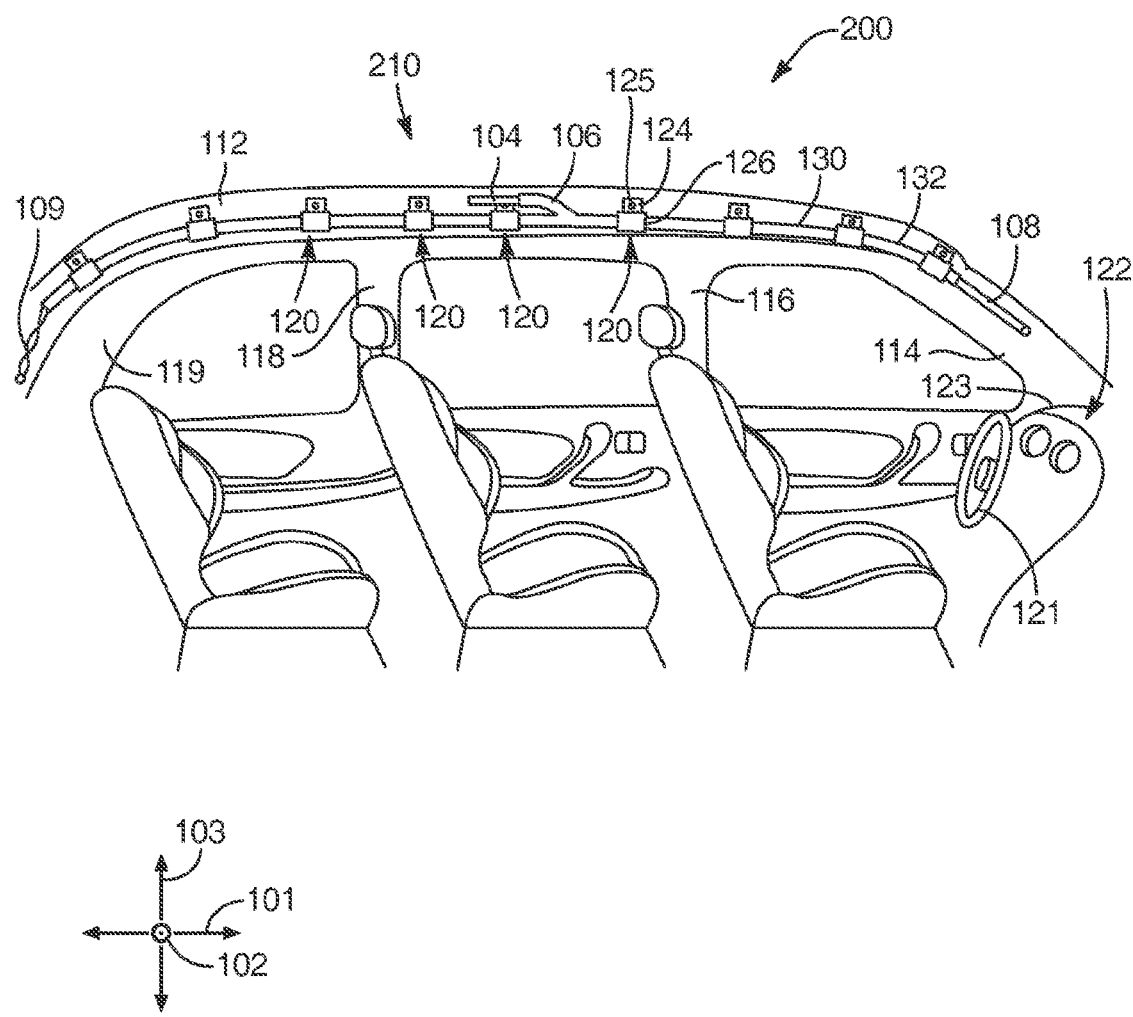
FIG. 4 is a side elevation view of an airbag assembly in a stowed configuration within a vehicle according to one exemplary alternative embodiment of the invention.

Referring to FIG. 4, a side elevation view illustrates an airbag assembly 200 according to an alternative exemplary embodiment of the invention, with an inflatable curtain airbag 210 in a stowed configuration within a vehicle. Like the airbag assembly 100, the airbag assembly 200 may include an inflator 104 connected to the inflatable curtain airbag 210 via a tube 106, and a forward tether 108 and a rear tether 109 that cooperate to provide tension to keep the inflatable curtain airbag 210 in position upon deployment. The inflatable curtain airbag 210 may be secured to the roof rail 112 via a plurality of mounting assemblies 120, each of which may include a tab 124, a fastener 125, and a wrapper 126. As in the previous embodiment, the wrappers 126 may break open during initial inflation of the inflatable curtain airbag 210 to permit deployment of the inflatable curtain airbag 210.

The inflatable curtain airbag 210 may be designed to minimize the need for storage of or attachment of airbag components to the A-pillar 114. Thus, the inflatable curtain airbag 210 may have a design in which the portions of the inflatable curtain airbag 210 that deploy forward of the steering wheel 121 are positioned adjacent to the forward portion of the roof rail 112 rather than stored within the trim on the A-pillar 114. More specifically, the inflatable curtain airbag 210 may have a first protection zone 230 that deploys generally rearward of the steering wheel 121, and a second protection zone 232 that deploys generally forward of the steering wheel 121. In the stowed configuration, the second protection zone 232 may be folded rearward to overlie the first protection zone 230. The term "overlie" refers to two objects with outward-facing surfaces that are positioned against each other.

Thus, the package defined by the inflatable curtain airbag 210 in the stowed configuration of FIG. 4 may be somewhat larger proximate the forward portion of the roof rail 112 than that of the inflatable curtain airbag 110 of the previous embodiment. None of the mounting assemblies 120 need be secured to the A-pillar 114. This leaves the A-pillar 114 free of airbag components apart from the forward tether 108. This may minimize the bulk of material stored within the trim on the A-pillar 114. Further, such a configuration may enhance the overall safety level of the airbag assembly 200 by reducing the risk of airbag components being projected from the A-pillar or the A-pillar trim during deployment of the airbag assembly 200.

In alternative embodiments of the invention, only one of the mounting assemblies (i.e., the forward-most mounting assembly) may be secured to the A-pillar. Many of the benefits cited above may still be obtained with such a configuration, particularly if the A-pillar trim is larger toward its juncture with the roof rail, thereby leaving more space at the top end of the A-pillar.

Figure 5:
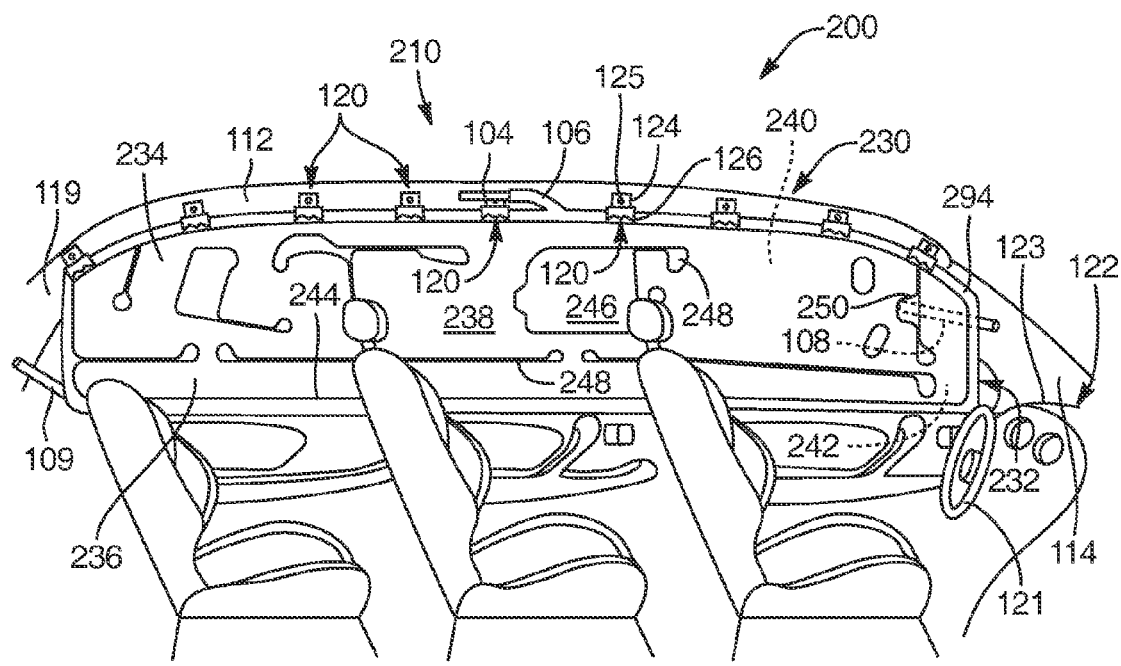
FIG. 5 is a side elevation view of the airbag assembly of FIG. 4, wherein the inflatable curtain airbag is in a deployed configuration.
Figure 5:
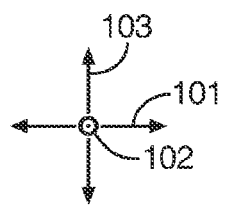

Referring to FIG. 5, a side elevation view illustrates the airbag assembly 200 of FIG. 4, with the inflatable curtain airbag 210 in the deployed configuration. Deployment may initially occur substantially as set forth above in the description of the airbag assembly 100 of FIGS. 1-3. Thus, as shown, the wrappers 126 may break open to release the inflatable curtain airbag 210, and the inflatable curtain airbag 210 may extend downward to protect occupants of the vehicle from impact against the lateral surfaces of vehicle.

As shown, the inflatable curtain airbag 210 has a configuration generally similar to that of the inflatable curtain airbag 110, with some differences. The inflatable curtain airbag 210 may have an upper portion 234 and a lower portion 236. The inflatable curtain airbag 210 may be formed by an inboard section 238 and an outboard section 239 that are secured together through any of the methods mentioned previously at a peripheral juncture, for example, with peripheral stitching 244. A "peripheral juncture" may be any feature by which inboard and outboard elements are joined to define an interior chamber. Thus, the peripheral stitching 244 is only one of many possible embodiments of a peripheral juncture. Other embodiments include an ultrasonically welded juncture, a one-piece woven juncture, an adhesive or chemically bonded juncture, a mechanically fastened juncture, an RF welded juncture, and the like.

The inboard section 238 and the outboard section 239 may constitute a first fabric layer and a second fabric layer, respectively. Interior stitching 248 may be applied interior to the peripheral stitching 244. The inboard section 238 and the outboard section 239 may cooperate to define a first chamber 240 within the first protection zone 230 and a second chamber 242 within the second protection zone 232. The boundaries of the first chamber 240 and the second chamber 242 may be defined by the geometry of the peripheral stitching 244 and the interior stitching 248.

The inflatable curtain airbag 210 may not have inflation cells like the inflation cells 146 of the previous embodiment, but may, instead, have a plurality of non-inflating regions 246 defined by the interior stitching 248. The non-inflating regions 246 may be positioned proximate areas where impact from a vehicle occupant is unlikely, or where it is desirable to attach a tether or another airbag component. Such attachment may beneficially be done at the non-inflating regions 246 because the attachment can be carried out through the inboard section 238 and the outboard section 239 without impeding the inflation of the inflatable curtain airbag 210. The non-inflating regions 246 may also serve to reduce the volume of the inflatable curtain airbag 210 in the deployed configuration, thereby reducing the amount of inflation gas required, and thence, the size of the inflator 104.

A chamber divider 250 of the interior stitching 248 may be positioned between the first protection zone 230 and the second protection zone 232, and may thus separate the first chamber 240 from the second chamber 242. The chamber divider 250 may restrict the flow of inflation gas from the first chamber 240 into the second chamber 242, and may thus cause the first protection zone 230 to inflate generally prior to inflation of the second protection zone 232.

The second protection zone 232 may be much different from the second protection zone 132 of the previous embodiment in that the second protection zone 232 may be much more compact, and may be relatively narrow when deployed. This may help ensure that the inflatable curtain airbag 210, and particularly the enlarged, forward portion of the inflatable curtain airbag 210 where the second protection zone 232 overlies the first protection zone 230, compacts into the space provided for it in the trim for the roof rail 112.

During deployment, the inflation of the first protection zone 230 and the second protection zone 232 may cause the second protection zone 232 to generally pivot forward from its stowed position overlying the first protection zone 230. Thus, the second protection zone 232 may first pivot inboard until it extends in the lateral direction 102, wherein it is generally perpendicular to the first protection zone 230. From this position, the second protection zone 232 may continue to pivot forward, but now may pivot outboard. If left unchecked, this motion may continue until the second protection zone 232 is generally parallel to the first protection zone 230.

If the second protection zone 232 is permitted to fully unfold, i.e., pivot outboard until it is generally parallel to the first protection zone 230, it may no longer be optimally positioned to prevent impact of the occupant in the event of a small overlap collision. More precisely, such positioning may allow the driver's head to move along the forward outboard trajectory 174 as shown in FIG. 3, and move between the second protection zone 232 and the driver's side airbag. Thus, it is desirable to provide some mechanism for keeping the second protection zone 232 at an angle of less than 180° relative to the first protection zone 230, as viewed from the top. This angle will be shown in greater detail in FIG. 7.

A restraint member may be used to keep the second protection zone 232 from pivoting outboard into a position parallel to the first protection zone 230. A "restraint member" may be defined as any structure that serves to restrict the position and/or orientation of an object. In the airbag assembly 200, the restraint member may limit outboard motion of the second protection zone 232 during deployment.

In the airbag assembly 200, the restraint member may take the form of a tether 280 with a first end 282 secured to the first protection zone 230 and a second end 284 secured to the second protection zone 232. The first end 282 may be secured proximate a top edge of the first protection zone 230, and may be secured to the first protection zone 230 itself, or to a part of the vehicle such as the roof rail 112. In FIG. 5, the first end 282 is secured to one of the mounting assemblies 120, and may thus be secured to the roof rail 112 with the fastener 125 used to secure the tab 124 of the mounting assembly 120 to the roof rail 112. The second end 284 may be secured directly to the top edge of the second protection zone 232.

In alternative exemplary embodiments, such a restraint member may have a variety of configurations including flexible members such as cords or tethers, or rigid members such as rails, brackets, or the like. A rail (not shown) may have a sliding element such as a ring connected to the cushion, and may be secured proximate the roof of the vehicle to limit outboard and/or forward motion of the second protection zone 232. A bracket (not shown) or other hard stop may deploy downward from the vehicle roof to directly block forward and/or outboard motion of the second protection zone 232. Those of skill in the art will recognize that many other alternative devices may be used to restrict forward and/or outboard motion of the second protection zone 232.

Figure 6:
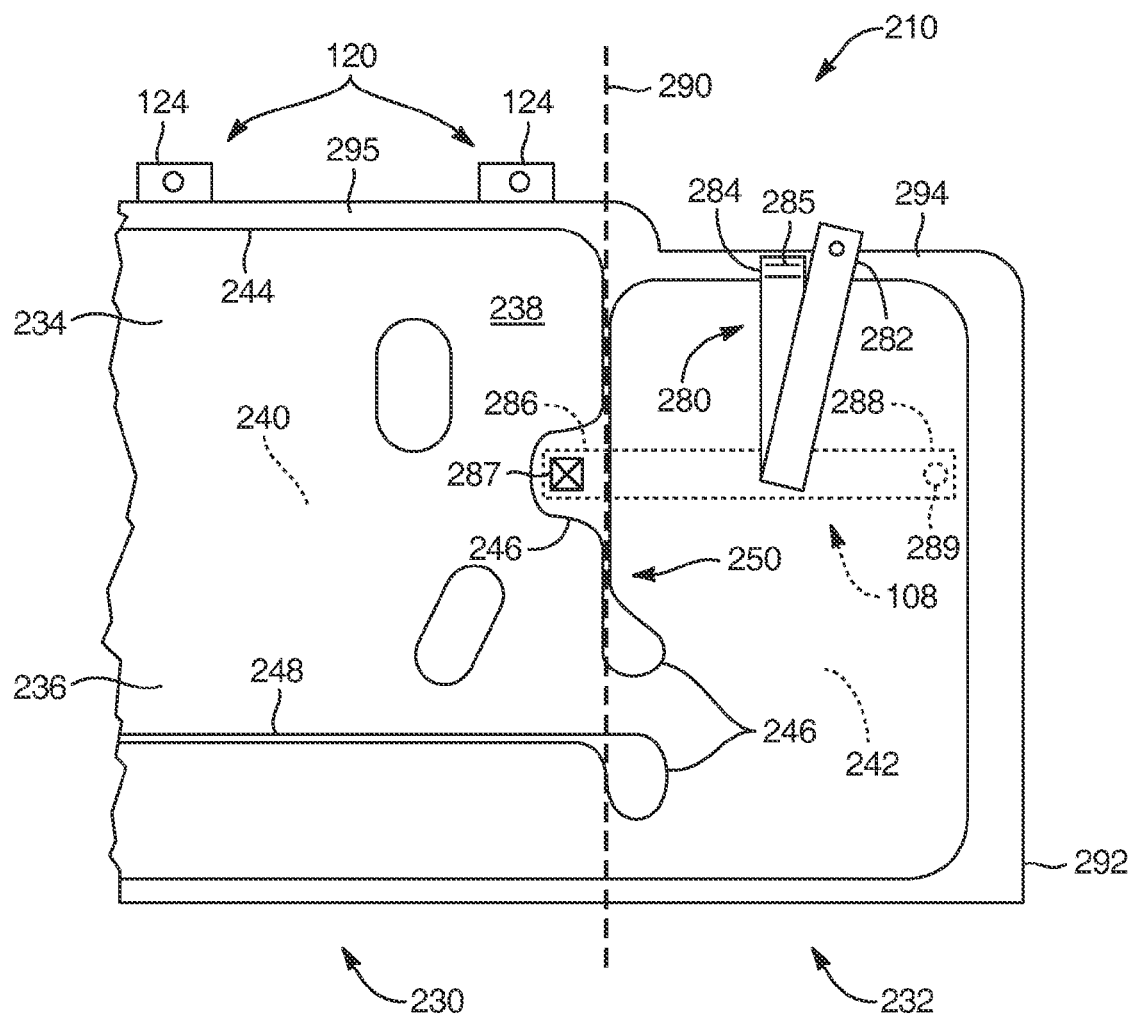
FIG. 6 is a side elevation view of the forward portion of the inflatable curtain airbag of the airbag assembly of FIG. 4, prior to compaction of the inflatable curtain airbag into the stowed configuration.
Figure 6:
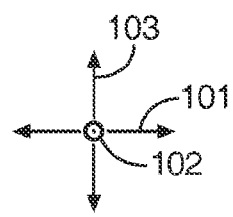

Referring to FIG. 6, a side elevation view illustrates the forward portion of the inflatable curtain airbag 210 of the airbag assembly 200 of FIG. 4, prior to compaction of the inflatable curtain airbag 210 into the stowed configuration. As shown, the chamber divider 250 may extend along most of the height of the inflatable curtain airbag 210 between the first chamber 240 and the second chamber 242. The forward tether 108 may have first end 286 secured to the inflatable curtain airbag 210 and a second end 288 securable to the vehicle. The first end 286 may be secured to the chamber divider 250, and more specifically, may be secured to a non-inflating region 246 that extends from the remainder of the chamber divider 250. The first end 286 may be secured to the region 246 via stitching 287. The second end 288 may have a hole 289 or other feature that facilitates attachment of the second end 288 to the A-pillar 114, for example, through the use of a fastener (not shown).

The chamber divider 250 may also form a natural fold line where, in the deployed configuration, the inflatable curtain airbag 210 is able to remain partially folded. It may be difficult to fold the inflatable curtain airbag 210 at other locations because the pressure of the inflation gas within the inflatable curtain airbag 210 and the manner in which the inflatable curtain airbag 210 bulges outward in the lateral direction 102 may tend to keep most regions of the inflatable curtain airbag 210 from bending away from the longitudinal direction 101. However, as the chamber divider 250 may extend along most of the height of the inflatable curtain airbag 210, the chamber divider 250 may provide a natural fold line.

The second chamber 242 of the second protection zone 232, as shown, is a single chamber. However, it should be understood that the second chamber 242 could be divided into multiple chambers without departing from the spirit of the invention. For example, the second chamber 242 could be divided into two adjacent chambers, a forward most chamber and an intermediate chamber. The intermediate chamber could have the chamber divider 250 at one side and the divider between the forward most chamber and the intermediate chamber at the other side. An airbag configuration with an intermediate chamber and a forward most chamber may align better along the contour of the side door, A-pillar, and instrument panel. One embodiment of the invention could have the intermediate chamber positioned to cushion the vehicle occupant from impacting the A-pillar and the forward most chamber positioned to cushion the vehicle occupant from impacting the instrument panel. Of course, a person of skill in the art, armed with the present disclosure, could determine a configuration using multiple chambers that would protect a vehicle occupant for a particular vehicle configuration.

The inflatable curtain airbag 210 may be folded at a stowed fold line 290 to compact it into the stowed configuration. As shown in FIG. 6, the stowed fold line 290 is the same as the natural fold line (i.e., the deployed fold line), and is thus defined by the chamber divider 250. In alternative embodiments, the inflatable curtain airbag 210 may be folded at a different location, i.e., either forward or rearward of the chamber divider 250. The location of the stowed fold line may have little impact on the deployed configuration of the inflatable curtain airbag 210 because the chamber divider 250 may determine where the fold is located in the deployed configuration.

The attachment location of the first end 286 of the forward tether 108 may be selected to provide the desired level of tension on the second protection zone 232. More specifically, securing the first end 286 forward of the chamber divider 250 may cause the forward tether 108 to exert tension in the longitudinal direction 101 on not only the first protection zone 230, but on the second protection zone 232 as well. Such tension may help unfold the second protection zone 232 by helping pivot the second protection zone 232 forward during deployment, but may also act to draw the second protection zone 232 toward a position in which the second protection zone 232 is parallel to the first protection zone 230. As set forth above, this may not be desirable.

Securing the first end 286 rearward of the chamber divider 250 may cause the forward tether 108 to exert tension in the longitudinal direction 101 on only the first protection zone 230. Securing the first end 286 directly on the chamber divider 250, or forward of, but close to, the chamber divider 250, may cause the forward tether 108 to exert some level of tension on the second protection zone 232, but with a short moment arm so that the resulting moment tending to pivot the second protection zone 232 forward is relatively small.

Hence, the attachment point of the first end 286 may be carefully selected to obtain the desired balance between expeditious deployment of the second protection zone 232 and maintenance of the second protection zone 232 at the proper orientation to provide protection in the event of a small overlap, oblique, or rollover collision. In the embodiment of FIG. 6, the first end 286 may be secured to the non-inflating region 246 of the chamber divider 250, which extends generally rearward of the remainder of the chamber divider 250. Thus, as configured in FIG. 6, the forward tether 108 may exert little, if any, longitudinal tension on the second protection zone 232.

The second end 284 of the tether 280 may be secured to a top edge 294 of the second protection zone 232, for example, via stitching 285. The second end 284 may be secured above the peripheral stitching 244 at the top of the second protection zone 232 so that the stitching 285 securing the second end 284 to the second protection zone 232 can extend through the inboard section 238 and the outboard section 239 without impeding inflation of the second protection zone 232.

The second end 284 may be secured to the top edge 294 at a location approximately equidistant from the deployed fold line, or the chamber divider 250, and a forward edge 292 of the second protection zone 232. Thus, the second end 284 may be secured at a location generally near the center of the second protection zone 232 in the longitudinal direction 101. This location may provide a balance between conserving tether material, which would favor attachment closer to the chamber divider 250, and providing a long moment arm to keep the second protection zone 232 in place in the event of relatively high-velocity motion of the occupant.

It may be desirable to moderate this moment arm to avoid keeping the second protection zone 232 in place too rigidly. More specifically, it may be advantageous to provide some ability for the second protection zone 232 to pivot outboard, toward a position parallel to the first protection zone 230, to soften the impact of the occupant against the second protection zone 232. The location of the second end 284 may be carefully selected to strike the optimal balance between rigidity and flexibility in the position of the second protection zone 232.

From the configuration of FIG. 6, the inflatable curtain airbag 210 may need to be at least partially compacted prior to attachment of the first end 282 of the tether 280 to the mounting assembly 120 that corresponds to it (i.e., the mounting assembly 120 on the left in FIG. 6) because the tether 280 may not be long enough to be simultaneously attached to the mounting assembly 120 and the desired location on the top edge 294 with the inflatable curtain airbag 210 laid flat as shown.

According to one example, with the second end 284 secured to the top edge 294 as shown, the inflatable curtain airbag 210 may be folded inboard at the stowed fold line 290. Thus, the forward edge 292 may be brought inboard, or out of the page with reference to the view of FIG. 6, and then brought rearward (or to the left in the view of FIG. 6) until the forward edge 292 overlies the corresponding region of the first protection zone 230. The fold line 290 may then be the forward edge of the inflatable curtain airbag 210. The first end 282 of the tether 280 may then be secured to the tab 124 of the mounting assembly 120. In the alternative, this may be done when the airbag assembly 200 is installed in the vehicle.

After the inflatable curtain airbag 210 has been folded in the longitudinal direction 101, the inflatable curtain airbag 210 may be rolled, folded, or otherwise compacted in the transverse direction 103. This may provide the elongated shape of the inflatable curtain airbag 210 in the stowed configuration. With the inflatable curtain airbag 210 in the stowed configuration, the mounting assemblies 120 may easily be secured to the roof rail 112 to install the inflatable curtain airbag 210 in the vehicle. As mentioned previously, none of the mounting assemblies 120 need be secured to the A-pillar 114.

Figure 7:
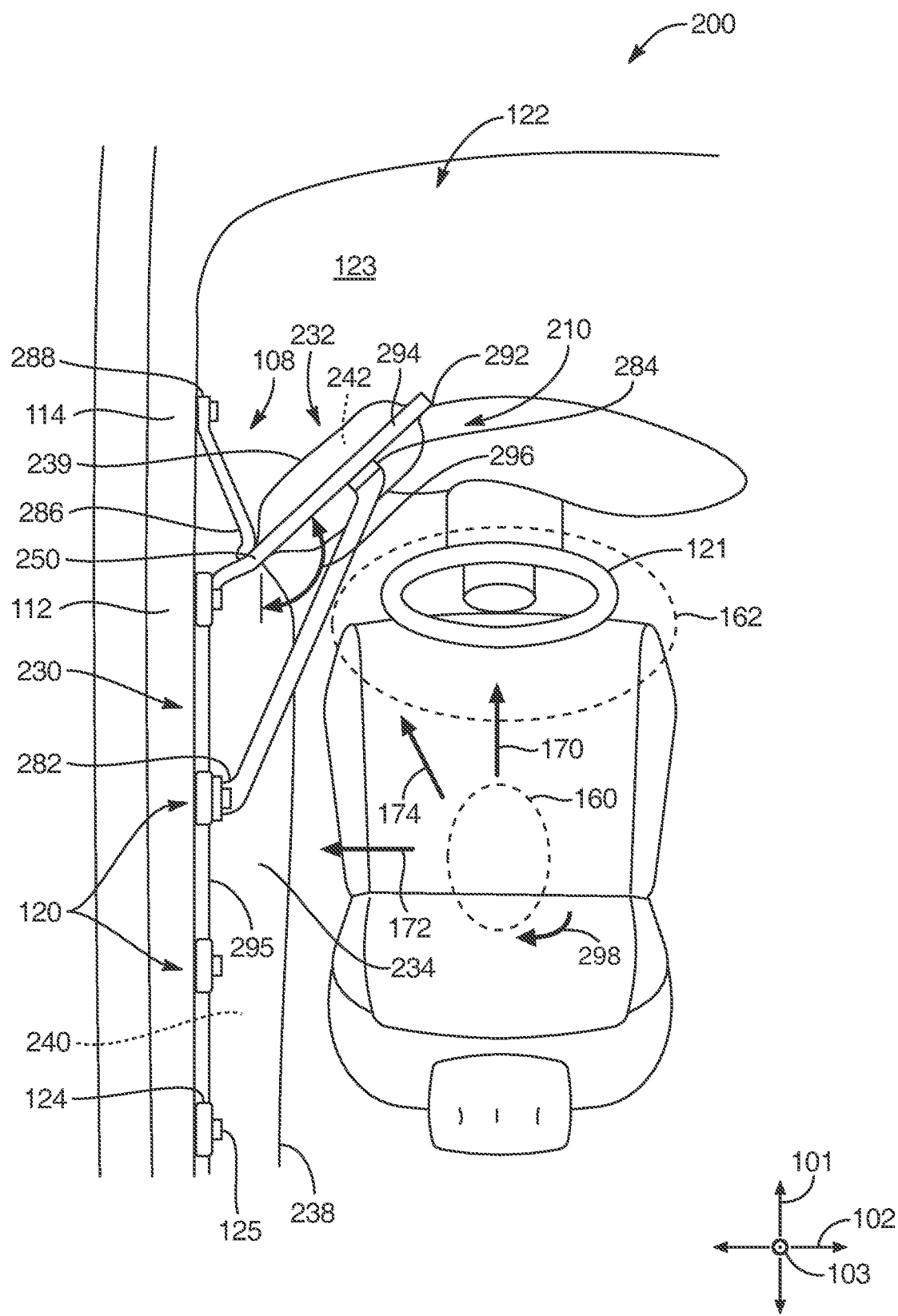
FIG. 7 is a top view of the airbag assembly of FIG. 4, wherein the inflatable curtain airbag is in the deployed configuration.

Referring to FIG. 7, a top view illustrates the airbag assembly 200 of FIG. 4, wherein the inflatable curtain airbag 210 is in the deployed configuration. As shown, the second protection zone 232 has unfolded from the first protection zone 230 to an extent limited by the tether 280. The second protection zone 232 may be positioned to block the gap between the first protection zone 230 and the position 162 of the driver's side airbag. The second protection zone 232 may thus be positioned generally between the occupant zone 160 of the occupant's head and the A-pillar 114 and the outboard portion 123 of the instrument panel 122, thereby providing protection from impact against these surfaces.

As shown, the inflatable curtain airbag 210 may remain folded at the chamber divider 250, which defines the natural fold line of the inflatable curtain airbag 210. As mentioned previously, the stowed fold line of the inflatable curtain airbag 210 may also be at the chamber divider 250, but in alternative embodiments, this need not be the case. A natural fold line at a different location from the chamber divider 250 may or may not affect the configuration of the deployed inflatable curtain airbag.

As shown in FIG. 7, the second protection zone 232 may unfold at an angle 296 relative to the first protection zone 230. The angle 296 may be determined by the length and attachment locations of the tether 280. The angle 296 may advantageously be less than 180°. The angle 296 may fall within the range of 110° to 160°. More precisely, the angle 296 may fall within the range of 120° to 150°. Yet more precisely, the angle 296 may fall within the range of 130° to 140°. Still more precisely, the angle 296 may be about 135°.

Some impacts may lead to what is known as Z-axis rotation of the head of the vehicle occupant in the occupant zone 160, as indicated by the arrow 298. Z-axis rotation, if excessive, may result in injury to the head and/or neck (not shown) of the vehicle occupant. In certain embodiments, inflatable curtain airbags according to the present invention may be designed to reduce and/or minimize Z-axis rotation.

Figure 8:
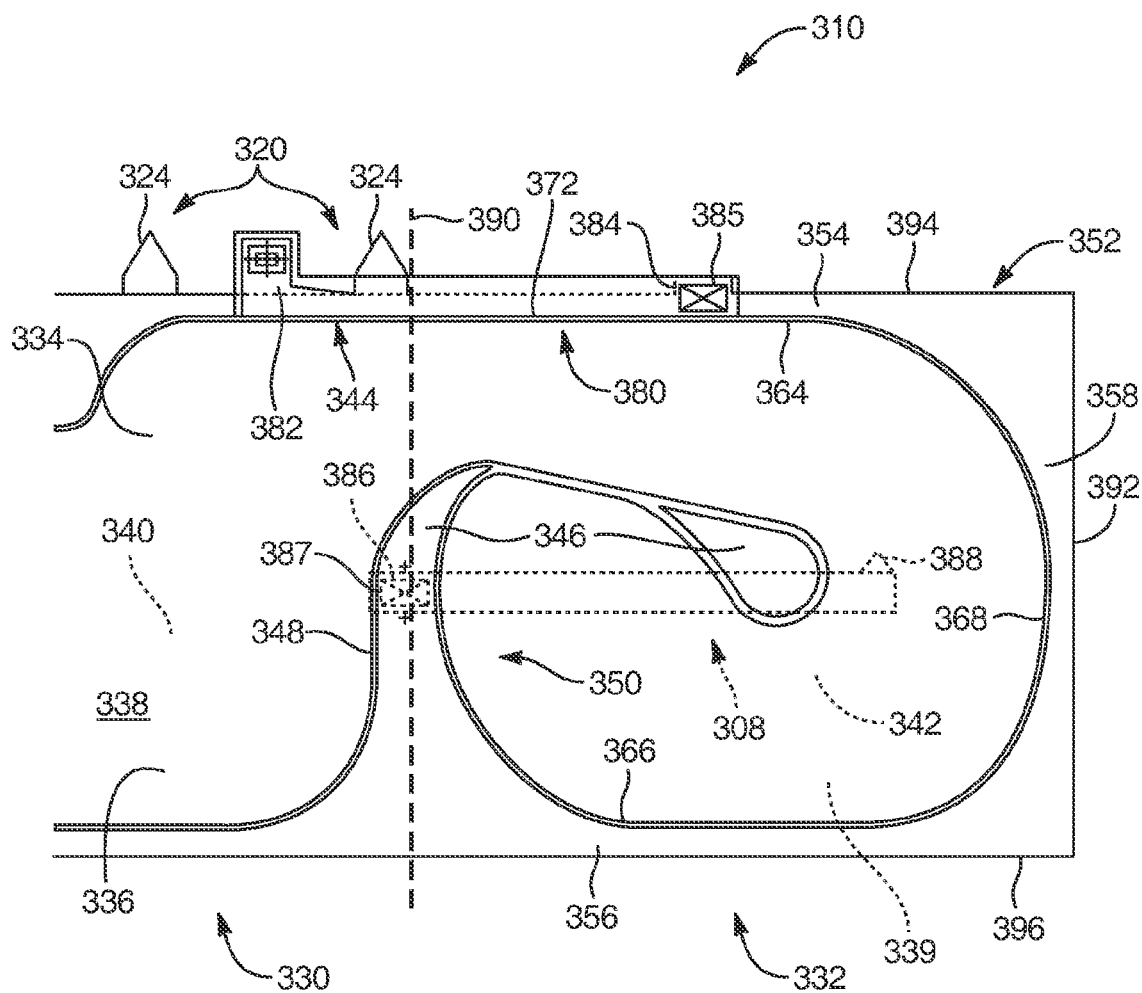
FIG. 8 is a side elevation view of the forward portion of an inflatable curtain airbag of an airbag assembly according to another alternative embodiment of the invention, prior to compaction of the inflatable curtain airbag into the stowed configuration.

Referring to FIG. 8, a side elevation view illustrates the forward portion of an inflatable curtain airbag 310 of an airbag assembly according to one alternative embodiment of the invention, prior to compaction of the inflatable curtain airbag 310 into the stowed configuration. The inflatable curtain airbag 310 may have a plurality of mounting assemblies 320 arranged along its length to facilitate attachment of the inflatable curtain airbag 310 to the vehicle. Each of the mounting assemblies 320 may have a tab 324, and optionally, other components like those described in the description of the mounting assemblies 120. If desired, all of the mounting assemblies 320 may be secured rearward of the A-pillar 114. Alternatively, one (i.e., the forward-most) of the mounting assemblies 320 may be secured to the A-pillar 114 adjacent to the roof rail 112.

Like the inflatable curtain airbag 210, the inflatable curtain airbag 310 may have a first protection zone 330 and a second protection zone 332 that unfolds forward of the first protection zone 330. The inflatable curtain airbag 310 may have an upper portion 334, a lower portion 336, an inboard section 338, and an outboard section 339 (facing away from the viewpoint of FIG. 8). The inboard section 338 and the outboard section 339 may constitute a first fabric layer and a second fabric layer, respectively. The inboard section 338 and the outboard section 339 may be secured together to define a first chamber 340 within the first protection zone 330 and a second chamber 342 within the second protection zone 332. The inboard section 338 and the outboard section 339 may be secured together at a peripheral juncture, for example, through the use of peripheral stitching 344. The peripheral stitching 344 may be particularly applicable to a cut-and-sewn airbag like the exemplary inflatable curtain airbag 310 of FIG. 8. However, as will be set forth in greater detail subsequently, other embodiments (not shown) may use different technologies to secure inboard and outboard layers together. For example, one-piece weaving technologies may be used, and may unify the inboard and outboard layers at the periphery of the airbag in such a manner that there is no stitching or seam.

Returning to the example of FIG. 8, interior stitching 348 may also be applied interior to the peripheral stitching 344, and may define one or more non-inflating regions 346. The second protection zone 332 may have a forward edge 392, a top edge 394, a bottom edge 396, and a rearward edge (not shown).

The first protection zone 330 and the second protection zone 332 may be separated from each other by a chamber divider 350, which may be defined by a non-inflating region 346 extending generally along the transverse direction 103. The non-inflating region 346 may extend along a substantial portion of the height of the inflatable curtain airbag 310; accordingly, the non-inflating region 346 may define a deployed fold line about which the inflatable curtain airbag 310 may remain partially folded after deployment. A stowed fold line 390 may be positioned at the chamber divider 350 so that the stowed fold line 390 is the same as the deployed fold line defined by the chamber divider 350.

The inflatable curtain airbag 310 may be secured to the vehicle via a forward tether 308, which may have a first end 386 secure to the inflatable curtain airbag 310 proximate the chamber divider 350, for example, via stitching 387, and a second end 388 that can be secured to the A-pillar 114 of the vehicle. A restraint member in the form of a tether 380 may be used to control the angle to which the second protection zone 332 unfolds relative to the first protection zone 330 in a manner similar to that of the tether 280 of the previous embodiment. The tether 380 may thus have a first end 382 that can be secured to one of the mounting assemblies 320, such as the mounting assembly 320 that is the second forward-most mounting assembly (the leftward mounting assembly in FIG. 8) at an appropriate time prior to, during, or after compaction of the inflatable curtain airbag 310. The tether 380 may also have a second end 384.

The inflatable curtain airbag 310 may be distinct from the inflatable curtain airbag 210 in several respects. In the inflatable curtain airbag 310, the second chamber 342 may fill from proximate its upper end. Thus, inflation gas may flow into the second chamber 342 between the upper edge of the non-inflating region 346 of the chamber divider 350 and the peripheral stitching 344 proximate the top edge 394. The passageway permitting gas into the second chamber 342 may be fairly broad, thereby allowing the second protection zone 332 to inflate rapidly. The second protection zone 332 may inflate simultaneously with inflation of the first protection zone 330, or with only a short delay therebetween.

Furthermore, the non-inflating region 346 that defines the chamber divider 350 may be significantly broader along the longitudinal direction 101 than the chamber divider 250 of the previous embodiment. This may help the inflatable curtain airbag 310 to remain folded at the chamber divider 350 at the desired angle (such as the angle 296 shown in connection with the previous embodiment) during deployment because the first protection zone 330 and the second protection zone 332 may each have ample room to expand before the portion of the second protection zone 332 adjacent to the chamber divider 350 engages the corresponding portion of the first protection zone 330. Such engagement may urge the second protection zone 332 to an orientation parallel to the first protection zone 330. The breadth of the chamber divider 350 may act in concert with the tether 380 to help ensure that the second protection zone 332 is able to remain at the optimal relative to the first protection zone 330.

Yet further, the geometry of the peripheral stitching 344 proximate the bottom end of the chamber divider 350 may also facilitate deployment of the inflatable curtain airbag 310 with the desired angle between the second protection zone 332 and the first protection zone 330. The curvature of the peripheral stitching 344 proximate the bottom end of the chamber divider 350 may serve to widen the chamber divider 350 proximate the bottom end of the inflatable curtain airbag 310, and may help to alleviate the longitudinal tension present in the bottom portion of the chamber divider 350 during the deployment process. This may further allow the second protection zone 332 to remain at the proper angle relative to the first protection zone 330.

The inflatable curtain airbag 310 may have a non-inflating peripheral region, or a peripheral region 352, positioned outside the peripheral stitching 344. The peripheral region 352 may lie on the opposite side of the peripheral stitching 344 from the first chamber 340 and the second chamber 342, and thus need not contain inflation gas. The inboard section 338 and the outboard section 339 may be secured together within the peripheral region 352, or may be left generally unattached in the peripheral region 352.

The peripheral region 352 may have a top portion 354, a bottom portion 356, a forward portion 358, and a rearward portion (not shown). The peripheral stitching 344 may also have a top portion 364, a bottom portion 366, a forward portion 368, and a rearward portion (not shown). The top portion 354 may lie generally above the top portion 364, the bottom portion 356 may lie generally beneath the bottom portion 366, and the forward portion 358 may lie generally forward of the forward portion 368. Similarly, the rearward portion of the peripheral region 352 may lie generally rearward of the rearward portion of the peripheral stitching 344.

The tether 380 may be cut from the fabric of the top portion 354 of the peripheral region 352. Thus, as shown, the tether 380 may be formed as a single piece with the top portion 354. The main body of the tether 380 may be separated from the remainder of the top portion 354 of the peripheral region 352 by a slit 372. The slit 372 may terminate short of the second end 384 of the tether 380 so that the top portion 354 of the peripheral region 352 remains joined to and unitary with the tether 380 at the second end 384.

The inflatable curtain airbag 310 may be formed by cutting or otherwise severing the material of the inboard section 338 and the outboard section 339 to define the edges of the inflatable curtain airbag 310, i.e., the forward edge 392, the top edge 394, the bottom edge 396, and the rearward edge (not shown). This process may define the profile of the inflatable curtain airbag 310. Then, the same or a different cutting or other severing process may be used to form the slit 372, thereby defining the tether 380 as distinct from the remainder of the top portion 354.

According to certain embodiments, inflatable curtain airbags may be designed to minimize the likelihood of certain collision situations. For example, an inflatable curtain airbag may be designed to cover a portion of the vehicle door to help protect against ejection of the occupant from the vehicle. Additionally or alternatively, an inflatable curtain airbag may have chambers shaped such that, upon deployment, the surfaces that receive impact are properly angled to reduce Z-axis rotation of the head (as mentioned in the description of FIG. 7 and indicated by the arrow 298). Additionally or alternatively, an inflatable curtain airbag may have chambers shaped to help counteract the tendency of the occupant's head to slide downward along the surface of the inflatable curtain airbag, which may lead to injury due to impact of the head against lower vehicle surfaces and/or excessive flexion or rotation of the neck. Some examples of such alternative embodiments will be shown and described in connection with FIGS. 9-12, as follows.

Figure 9:
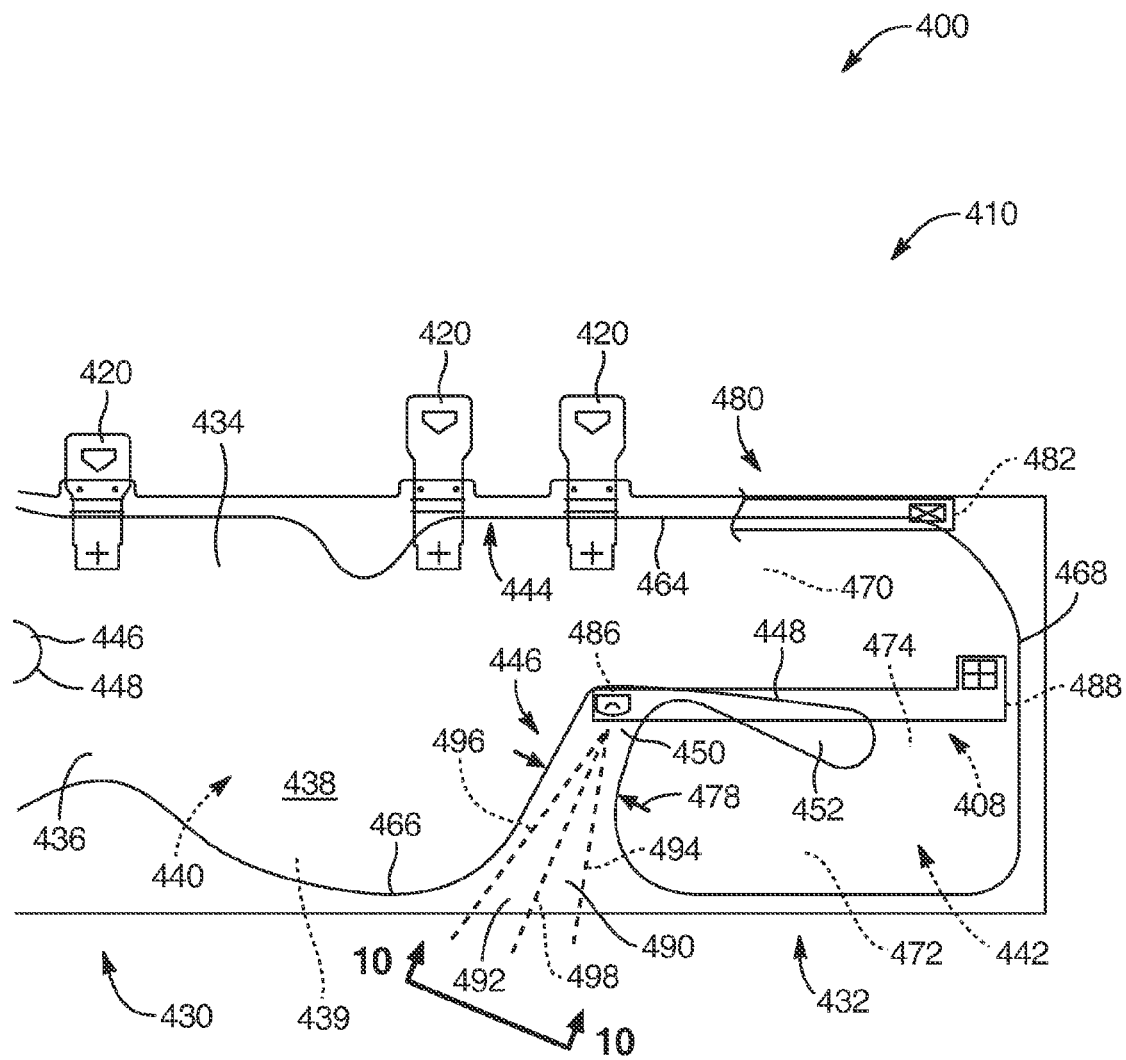
FIG. 9 is a side elevation view of the forward portion of an inflatable curtain airbag of an airbag assembly according to another alternative embodiment of the invention, prior to compaction of the inflatable curtain airbag into the stowed configuration.

Referring to FIG. 9, a side elevation view illustrates the forward portion of an inflatable curtain airbag 410 of an airbag assembly 400 according to another alternative embodiment of the invention. As with previous embodiments, the inflatable curtain airbag 410 may be secured proximate the roof rail of a vehicle (not shown) to protect one or more vehicle occupants from impact against a lateral surface of the vehicle. The inflatable curtain airbag 410 may be secured to the vehicle through the use of a plurality of mounting assemblies 420, which may be configured in a manner similar to those described previously, or may have a different configuration.

The inflatable curtain airbag 410 may have a first protection zone 430 and a second protection zone 432 that inflate to provide the desired impact protection. The inflatable curtain airbag 410 may have an upper portion 434 and a lower portion 436. The inflatable curtain airbag 410 may be formed from first and second fabric layers, which may be an inboard section 438 and an outboard section 439. The inboard section 438 and the outboard section 439 may define a first chamber 440 within the first protection zone 430 and a second chamber 442 within the second protection zone 432.

The first chamber 440 and the second chamber 442 may be defined by a peripheral juncture that secures the inboard section 438 to the outboard section 439. The peripheral juncture may be formed with a wide variety of attachment methods and configurations including stitching, one-piece weaving, RF welding, ultrasonic welding, mechanical fastening, adhesive bonding, chemical bonding, or the like. In FIG. 9, the peripheral juncture may take the form of peripheral stitching 444 that generally encircles the periphery of the inflatable curtain airbag 410.

The inflatable curtain airbag 410 may also have one or more non-inflating regions 446 positioned within the space defined by the peripheral stitching 444. The non-inflating regions 446 may be defined by interior stitching 448 or alternatively, by a different form of attachment (such as one-piece weaving, RF welding, ultrasonic welding, mechanical fastening, adhesive bonding, chemical bonding, and the like) by which the inboard section 438 and the outboard section 439 are secured together within the space defined by the peripheral stitching 444. One such non-inflating region 446 (i.e., the forward-most non-inflating region 446 shown in FIG. 9) may form an impediment between the first chamber 440 and the second chamber 442. The impediment formed by the forward-most non-inflating region 446 may prevent gas flow between the lower portions of the first chamber 440 and the second chamber 442, but may terminate below the top portions of the first chamber 440 and the second chamber 442 so that inflation gas may enter the top portion of the second chamber 442 from the top portion of the first chamber 440. The peripheral stitching 444 may have a top portion 464, a bottom portion 466, a forward portion 468, and a rearward portion (not shown).

The airbag assembly 400 may also have a tether 408 that acts as a front tether, which may cooperate with a rear tether (not shown) to maintain tension on the inflatable curtain airbag 410 to keep the inflatable curtain airbag 410 in place after deployment. The tether 408 may have a first end 486 secured to the inflatable curtain airbag 410, as shown in FIG. 9, and a second end 488 attachable to the vehicle, for example, at the A-pillar 114.

The airbag assembly 400 may also have a tether 480 positioned proximate the top portion 464 of the peripheral stitching 444 as shown. Like the tether 380 of the inflatable curtain airbag 310 of FIG. 8, the tether 480 may help control the angle at which the second protection zone 432 is positioned relative to the first protection zone 430 when the airbag assembly 400 is in the deployed configuration. More specifically, tether 480 may cause the second protection zone 432 to be angled at less than 180° relative to the first protection zone 430 when the airbag assembly 400 is in the deployed configuration.

Thus, the tether 480 may have a first end 482, which may be secured to or unitarily formed with the inflatable curtain airbag 410 proximate the forward portion of the top portion 464. The tether 480 may also have a second end (not shown), which may be attachable to the vehicle, for example, at the roof rail 112. The second end may be attached at a position on the roof rail 112 rearward of the first end 482.

The non-inflating region 446 that divides the first chamber 440 from the second chamber 442 may have a generally vertical portion 450 and a generally horizontal portion 452. The generally vertical portion 450 may extend upward, into the interior of the inflatable curtain airbag 410, from the bottom portion 466 of the peripheral stitching 444. The generally horizontal portion 452 may extend forward, toward the forward portion 468 of the peripheral stitching 444, from the top end of the generally vertical portion 450.

Thus, the non-inflating region 446 may, in addition to dividing the first chamber 440 from the second chamber 442 at the generally vertical portion 450, divide the second chamber 442 into an upper segment 470 and a lower segment 472 at the generally horizontal portion 452. The forward end of the generally horizontal portion 452 may also be enlarged so as to define a forward segment 474 that extends between and provides fluid communication between the upper segment 470 and the lower segment 472.

During deployment, inflation gas may flow from the inflator 104 (not shown in FIG. 9) into the first chamber 440 through the tube 106, and from the first chamber 440 into the second chamber 442 through the space between the top end of the generally vertical portion 450 of the non-inflating region 446 and the top portion 464 of the peripheral stitching 444. From this space, the inflation gas may enter the second chamber 442 through the upper segment 470. From the upper segment 470, the inflation gas may flow into the forward segment 474, and from the forward segment 474 downward into the lower segment 472. The rearward end of the forward segment 474 may form a dead end.

The upper segment 470, the forward segment 474, and the lower segment 472 may cooperate to define a non-branching passageway that conveys inflation gas through the second chamber 442. A "non-branching passageway" may be defined as a passage that conveys a fluid with no significant alternative flow pathways. Thus, the non-branching passageway defined by the upper segment 470, the forward segment 474, and the lower segment 472 may have no dividers, alcoves, sub-chambers, or other structures that would divert impact inflation gas flow through the main, generally U-shaped shape provided by the upper segment 470, the forward segment 474, and the lower segment 472.

The generally vertical portion 450 of the non-inflating region 446 may have a width 478 that is larger than strictly needed to serve as an impediment between the first chamber 440 and the second chamber 442. The width 478 may be sufficient to leave a significant gap between the first chamber 440 and the second chamber 442 such that, in the deployed configuration, the inflatable curtain airbag 410 is able to fold in-plane (i.e., within the plane in which the inflatable curtain airbag 410 generally exists in the deployed configuration).

The width 478 may be within the range of 7 mm to 120 mm. The width 478 may further be from 20 mm to 80 mm. The width 478 may be about 40 mm.

The in-plane folding may compress the width 478 to move the lower end of the first chamber 440 toward the lower end of the second chamber 442. This may occur due to the fact that the roof rail 112 and the A-pillar 114 join at an angle of less than 180°, while the top portion 464 of the peripheral stitching 444 may be substantially straight. Thus, the interior of the vehicle may exert reaction forces against the inflatable curtain airbag 410 that urge the second protection zone 432 to tilt downward relative to the first protection zone 430.

The width 478 of the non-inflating region 446 may facilitate this downward tilt, which may allow the inflatable curtain airbag 410 to provide superior protection as will be shown and described in connection with FIG. 11. If desired, the in-plane folding of the inflatable curtain airbag 410 may be further encouraged by taking extra measures to compress the width 478 after the inboard section 438 and the outboard section 439 have been secured together.

For example, the generally vertical portion 450 may have a forward portion 490 and a rearward portion 492. The forward portion 490 may be attached to the rearward portion 492 to compress the non-inflating region 446 by bringing the forward portion 490 and the rearward portion 492 closer together. This may define a forward fold 494, a rearward fold 496, and a compaction feature in the form of a central fold 498. This will be further shown and described in connection with FIG. 10A.

Figure 10A:
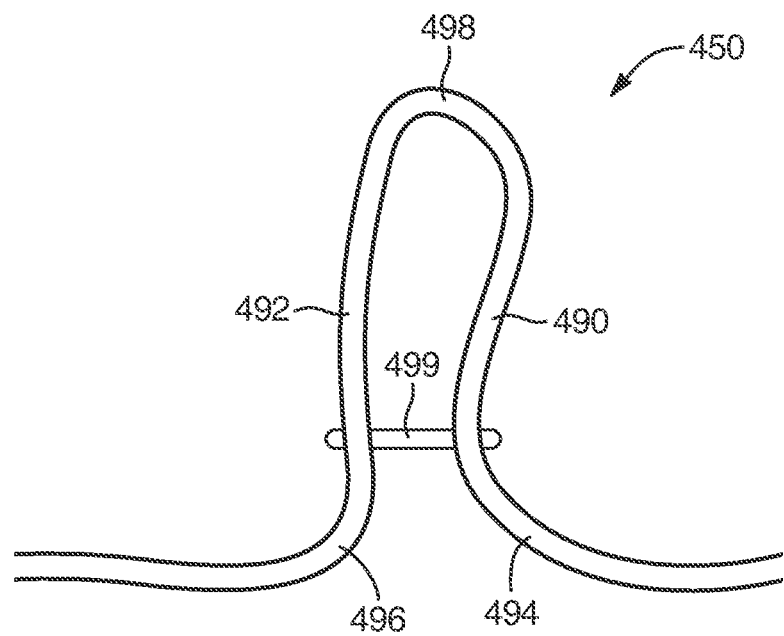
FIG. 10A is an oblique section view of the non-inflating region of the inflatable curtain airbag of FIG. 9 after attachment of the forward portion of the non-inflating region to the rearward portion of the non-inflating region.

Referring to FIG. 10A, an oblique section view illustrates the generally vertical portion 450 of the non-inflating region 446 of the inflatable curtain airbag 410 of FIG. 9 after attachment of the forward portion 490 of the non-inflating region 446 to the rearward portion 492 of the non-inflating region 446. The forward portion 490 may be attached to the rearward portion 492 by an attachment feature, which may take the form of stitching 499.

The stitching 499 may be applied, for example, by first folding the generally vertical portion 450 to form the forward fold 494, the rearward fold 496, and the central fold 498 in the non-inflating region 446. The forward portion 490 may then overlie the rearward portion 492 to form the V-shape illustrated in FIG. 10A. Then, the stitching 499 may be applied through the forward portion 490 and the rearward portion 492 to secure the forward portion 490 to the rearward portion 492.

FIG. 10A illustrates the forward fold 494, the rearward fold 496, and the central fold 498 with what may be exaggerated roundness—they may be creased, or may be more rounded as shown. Additionally, FIG. 10A illustrates the existence of a significant gap between the forward portion 490 and the rearward portion 492 after the stitching 499 is applied; if desired, the stitching 499 may be drawn tight to close the gap and cause the forward portion 490 to directly abut the rearward portion 492.

In other embodiments, the non-inflating region 446 may be cut to divide the forward portion 490 from the rearward portion 492. The cut may be in place of the central fold 498 shown in FIG. 10A. In such embodiments, the forward portion 490 and the rearward portion 492 may each be folded 90° as in FIG. 10A; thus, the forward fold 494 and the rearward fold 496 may be present substantially as shown in FIG. 10A, with the central fold 498 replaced with a cut.

Figure 10B:
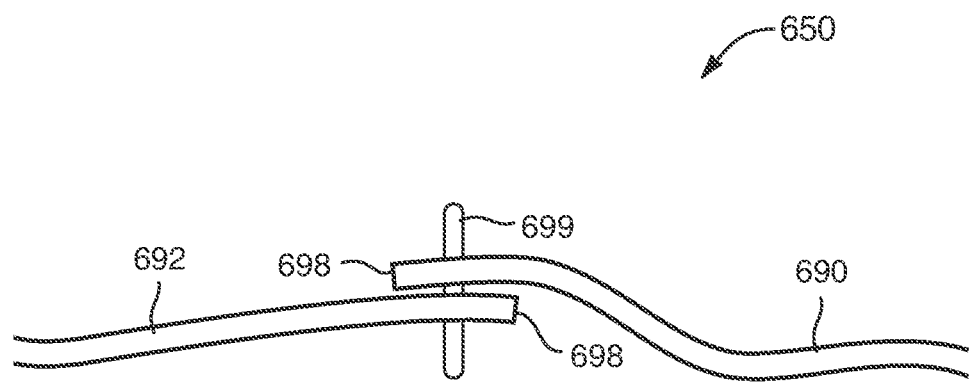
FIG. 10B is an oblique section view of the non-inflating region of an inflatable curtain airbag according to another alternative embodiment of the invention after attachment of the forward portion of the non-inflating region to the rearward portion of the non-inflating region.

Referring to FIG. 10B, an oblique section view illustrates the generally vertical portion 650 of a non-inflating region of an inflatable curtain airbag (not shown) according to another alternative embodiment of the invention. The generally vertical portion 650 may have a forward portion 690 and a rearward portion 692. The forward portion 690 may be separated from the rearward portion 692 by a compaction feature in the form of a cut 698 formed in the generally vertical portion 650 between the forward portion 690 and the rearward portion 692. No folding operation may be needed to compress the generally vertical portion 650. Rather, the forward portion 690 and the rearward portion 692 may remain in-plane with the remainder of the inflatable curtain airbag, and may be drawn together in-plane such that they overlap with and overlie each other. Then, the forward portion 690 and the rearward portion 692 may be attached together by any method known in the art, including but not limited to sewing, one-piece weaving, RF welding, ultrasonic welding, chemical bonding, adhesive bonding, and mechanical fastening. As shown in the exemplary embodiment of FIG. 10B, the forward portion 690 may be secured to the rearward portion 692 via stitching 699. This may serve to compress the width 478 of the generally vertical portion 650 of the corresponding non-inflating region in a manner similar that of the embodiment shown in FIG. 10A.

FIGS. 10A and 10B both provide compression of the width 478. Returning to the exemplary example of FIG. 10A, the compression of the width 478 may cause the second protection zone 432 to tilt downward relative to the first protection zone 430 in the deployed configuration, regardless of the shape of the interior of the vehicle. This may offer significant benefits, as will be shown and described in connection with FIG. 11, as follows.

Figure 11:
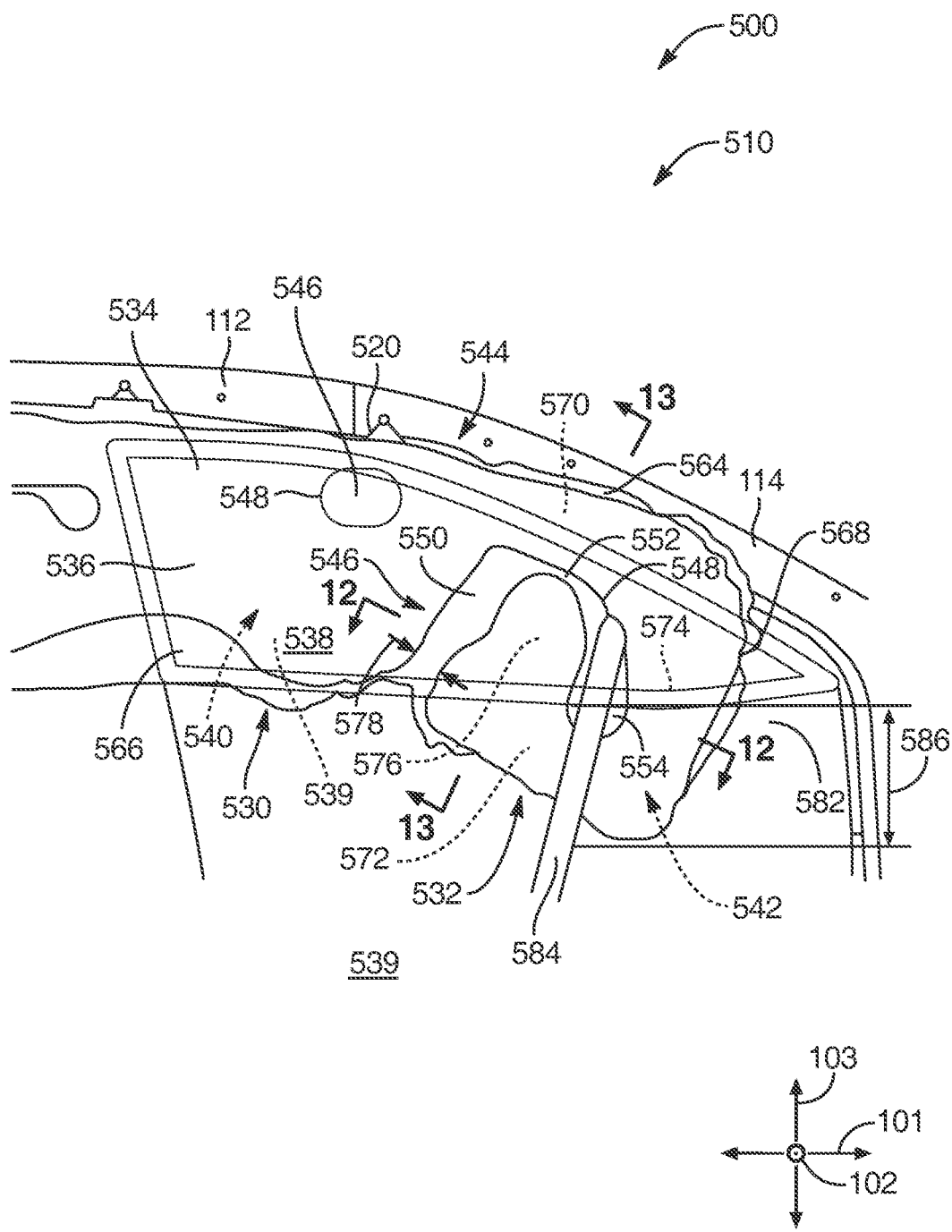
FIG. 11 is a side elevation view of the forward portion of an inflatable curtain airbag according to another alternative embodiment of the invention, in the deployed configuration.

Referring to FIG. 11, a side elevation view illustrates the forward portion of an inflatable curtain airbag 510 of an airbag assembly 500 according to another alternative embodiment of the invention, in the deployed configuration. The inflatable curtain airbag 510 may be similar to the inflatable curtain airbag 410 of FIG. 9, with mounting assemblies 520, a first protection zone 530 with a first chamber 540, and a second protection zone 532 with a second chamber 542. The inflatable curtain airbag 510 may also have an upper portion 534 and a lower portion 536, and may be formed from an inboard section 538 and an outboard section 539.

The inboard section 538 and the outboard section 539 may be secured together at a peripheral juncture, which may take the form of peripheral stitching 544. The peripheral stitching 544 may have a top portion 564, a bottom portion 566, a forward portion 568, and a rearward portion (not shown). The airbag assembly 500 may optionally have a tether like the tether 480 and/or a tether 408 like those of FIG. 9; such tethers are not shown in FIG. 11 for clarity.

The inboard section 538 and the outboard section 539 may further be secured together by interior stitching 548 at a plurality of non-inflating regions 546, the forward-most of which may separate the first chamber 540 from the second chamber 542. This non-inflating region 546 may have a generally vertical portion 550 and a generally horizontal portion 552, which may be similar to those of FIG. 9. However, as shown, the non-inflating region 546 of the inflatable curtain airbag 510 of FIG. 11 may also have a terminal portion 554 that extends downward from the forward end of the generally horizontal portion 552.

The generally horizontal portion 552 may divide the second chamber 542 into an upper segment 570 and a lower segment 572. The terminal portion 554 may divide the second chamber 542 into a forward segment 574 and a terminal segment 576. The forward segment may extend generally vertically to convey inflation gas between the forward ends of the upper segment 570 and the lower segment 572. The terminal segment 576 may extend generally upward from the rearward end of the lower segment 572 and may terminate, at its upper end, in a dead end.

During deployment, inflation gas may flow from the inflator 104 (not shown in FIG. 9) into the first chamber 540 through the tube 106, and from the first chamber 540 into the second chamber 542 through the space between the top end of the generally vertical portion 550 of the non-inflating region 546 and the top portion 564 of the peripheral stitching 544. From this space, the inflation gas may enter the second chamber 542 through the upper segment 570. From the upper segment 570, the inflation gas may flow into the forward segment 574, and from the forward segment 574 downward into the lower segment 572. The inflation gas may then flow rearward through the lower segment 572, and thence into the terminal segment 576. As mentioned, the top end of the terminal segment 576 may form a dead end. The upper segment 570, the forward segment 574, the lower segment 572, and the terminal segment 576 may cooperate to define a non-branching passageway that conveys inflation gas through the second chamber 542.

As shown, the vehicle may have a roof rail 112 and an A-pillar 114 like those shown in previous embodiments. A window 580 may be present, and may extend under the forward portion of the roof rail 112 and the rearward portion of the A-pillar 114. A door 582 may be positioned underneath the window 580. The vehicle may also have a steering wheel 584.

The in-plane bending of the inflatable curtain airbag 510 may advantageously cause the second protection zone 532 to extend significantly below the bottom of the window 580. The second protection zone 532 may have an overlap 586 with the door 582 that, at its maximum, may be from 5 cm to 50 cm. The overlap 586 may further be from 10 cm to 30 cm. The overlap 586 may be about 20 cm.

Thus, a significant portion of the second protection zone 532 may be positioned directly inboard of the door 582. This overlap 586 may make it more difficult for the impact of the occupant against the inflatable curtain airbag 510 to push the inflatable curtain airbag 510 out of the vehicle through the window 580. This may, in turn help reduce the likelihood of ejection of the occupant from the vehicle. Further, the overlap 586 may help to more effectively cushion the vehicle occupant against impact with the door 582.

Figure 12:
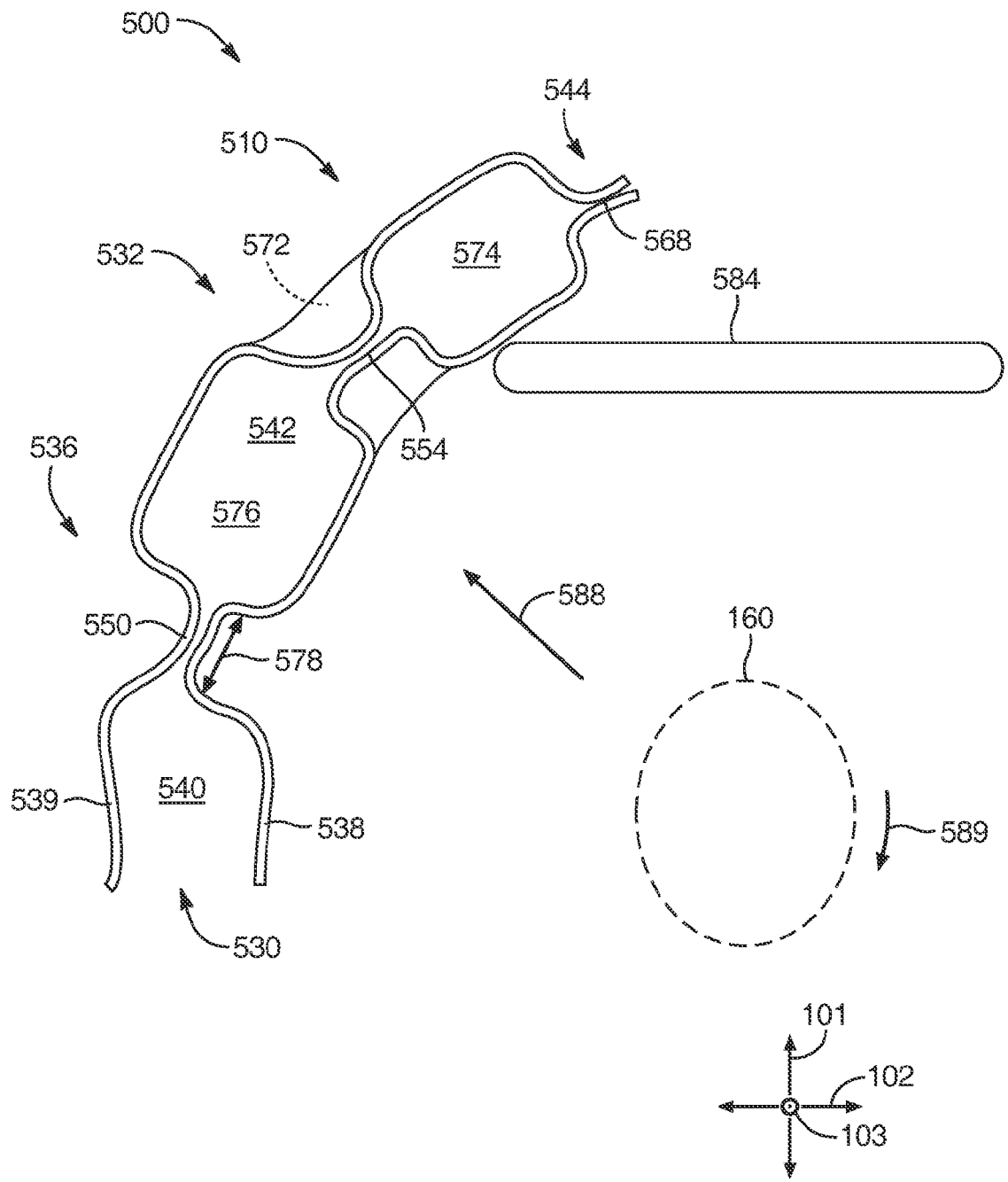
FIG. 12 is an oblique section view taken through the plane marked 12-12 of the inflatable curtain airbag of FIG. 11 in the deployed configuration.

Referring to FIG. 12, an oblique section view through the plane marked 12-12 in FIG. 11 illustrates the inflatable curtain airbag 510 of the airbag assembly 500 in the deployed configuration. As shown, a significant portion of the second protection zone 532 may also be positioned forward of the steering wheel 584. The forward portion of the second protection zone 532 may be angled inboard due to the operation of a top tether like the tether 480 of FIG. 9 (not shown), and may be positioned close to the deployed location of a frontal impact airbag (not shown) mounted in the steering wheel 584. Thus, the second protection zone 532 may help to reduce the possibility of the occupant's head passing between the inflatable curtain airbag 510 and the frontal impact airbag, which may tend to occur in small overlap collision situations. FIG. 12 illustrates the occupant zone 160 that may be occupied by the occupant's head, and an arrow 588 indicating one possible trajectory of the occupant's head toward the inflatable curtain airbag 510.

In addition to ejection mitigation and small overlap collision protection, the airbag assembly 500 may help reduce Z-axis rotation of the occupant's head, as shown and described in connection with FIG. 7. Z-axis rotation is further indicated by the arrow 589 in FIG. 12. More precisely, the generally vertical portion 550 of the non-inflating region 546 may have a width 578, which may optionally be the same as or similar to the width 478 of the generally vertical portion 450 of the non-inflating region 446 of FIG. 9. The width 578 may be large enough to facilitate the in-plane bending of the inflatable curtain airbag 510, but not so large as to permit the generally vertical portion 550 to directly receive the vehicle occupant's head, which may lead to strikethrough and/or undesired Z-axis rotation of the head.

The geometry of the second chamber 542 may further enhance impact protection by reducing the tendency of the occupant's head to slide downward after striking the inflatable curtain airbag 510. The manner in which these benefits are achieved will be shown and described in connection with FIG. 13, as follows.

Figure 13:
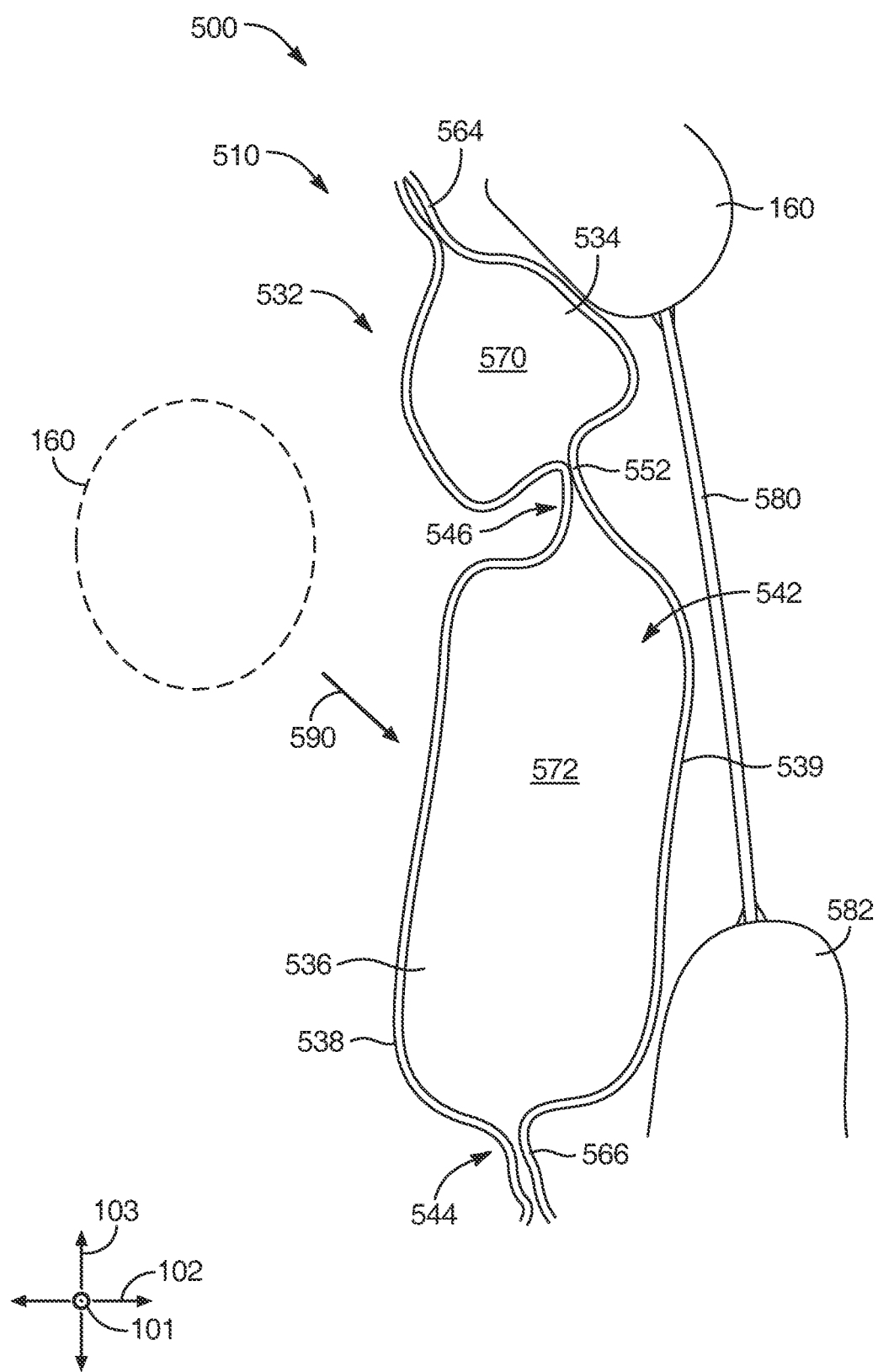
FIG. 13 is an oblique section view taken through the plane marked 13-13 of the second protection zone of the inflatable curtain airbag of FIG. 11 in the deployed configuration.

Referring to FIG. 13, an oblique section view taken through the plan marked 13-13 in FIG. 11 illustrates the second protection zone 532 of the inflatable curtain airbag of FIG. 11 in the deployed configuration. FIG. 13 further illustrates how the inflatable curtain airbag 510 may inflate inboard of the roof rail 112, the window 580, and the door 582. Overlap of the second protection zone 532 with the door 582 is also shown.

As mentioned previously, the generally horizontal portion 552 of the non-inflating region 546 may separate the second chamber 542 into the upper segment 570 and the lower segment 572. This separation may cause the second chamber 542 to fold along the generally horizontal portion 552 in a manner that angles the upper segment 570 and the lower segment 572 toward each other, creating a slight V-shape as shown. Hence, the inboard section 538 of the lower segment 572 may present an exterior surface that is angled at least slightly upward. This may occur in spite of the fact that the door 582 and/or the window 580 may curve inboard from bottom to top, which curvature may otherwise tend to angle the inboard surfaces of the inflatable curtain airbag 510 downward. With the second chamber 542 divided into the upper segment 570 and the lower segment 572, the geometry of the door 582 and/or the window 580 may actually help angle the exterior surface of the inboard section 538 upward since the door 582 may protrude inboard, causing the segment 572 to assume the angulation shown.

The head of the vehicle occupant, indicated by an occupant zone 160, may, during a collision, move outboard and downward as indicated by the arrow 590. The upward-facing exterior surface of the inboard section 538, on the segment 572, may receive the impact and cause the head to rebound upward again. This may help to prevent the injuries that could otherwise occur if the head were to slide downward along the inboard section 538 below the bottom of the second protection zone 532.

Thus, the airbag assembly 500 may help to reduce a wide variety of possible injury types. Further, the airbag assembly 500 may be effective in a wide variety of collision types. The airbag assembly 500 may be for the driver's side of the vehicle; a very similar structure may be used for the passenger's side (not shown). Alternatively, modifications may be made to the passenger's side airbag assembly to help it more effectively cooperate with the interior vehicle structures and/or frontal impact airbags of the passenger's side.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 Para. 6. It will be apparent to those having skill in the art that changes may be made to the details of the above-described embodiments without departing from the underlying principles of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An airbag assembly for disposition proximate a roof of a vehicle to shield a vehicle occupant from impacting at least one lateral surface of the vehicle, the airbag assembly comprising:
   an inflatable curtain airbag having a stowed configuration proximate the roof of the vehicle and a deployed configuration into which the inflatable curtain airbag deploys downward between the vehicle occupant and the at least one lateral surface of the vehicle, the inflatable curtain airbag comprising an inboard fabric layer and an outboard fabric layer that are secured together at a peripheral juncture to define, interior to the peripheral juncture, the peripheral juncture having a top portion and a bottom portion, the inflatable curtain airbag comprising:
   a first chamber;
   a second chamber in fluid communication with the first chamber; and
   a non-inflating region extending from the bottom portion of the peripheral juncture towards the top portion of the peripheral juncture to at least partially separate the first chamber from the second chamber, the non-inflating region having a width selected to permit in-plane bending of the inflatable curtain airbag at the non-inflating region such that the second chamber tilts downward relative to the first chamber and the width of the non-inflating region is reduced at the bottom portion of the peripheral juncture in the deployed configuration.

2. The airbag assembly of claim 1, wherein the non-inflating region comprises an angled portion that extends forward and upward from the bottom portion of the peripheral juncture between the first chamber and the second chamber.

3. The airbag assembly of claim 2, wherein the non-inflating region further comprises a forward portion that extends forward of the angled portion to divide the second chamber into an upper segment and a lower segment, wherein, in the deployed configuration, the second chamber inflates inboard of a window and the lower segment extends lower than a bottom of the window and lower than the first chamber.

4. The airbag assembly of claim 3, wherein the second chamber further comprises a forward segment, wherein the upper segment, the forward segment, and the lower segment cooperate to define a single non-branching passageway that conducts inflation gas from the first chamber to the upper segment, from the upper segment to the forward segment, and from the forward segment to the lower segment.

5. The airbag assembly of claim 3, wherein, in the deployed configuration, the lower segment is angled such that on the lower segment, an exterior surface of the inboard fabric layer faces upward.

6. The airbag assembly of claim 1, wherein the width of the non-inflating region is between 7 mm and 120 mm.

7. The airbag assembly of claim 1, wherein in the deployed configuration, the second chamber is positioned between an occupant zone that would ordinarily be occupied by the vehicle occupant's head and at least one of an A-pillar of the vehicle and a portion of an instrument panel of the vehicle.

8. The airbag assembly of claim 1, further comprising an attachment feature that attaches a forward portion of the non-inflating region to a rearward portion of the non-inflating region such that a compaction feature is defined between the forward portion and the rearward portion to compress the width of the non-inflating region, wherein the compaction feature is selected from the group consisting of a fold and a cut.

9. The airbag assembly of claim 8, wherein the attachment feature comprises stitching applied to the forward portion and the rearward portion.

10. An airbag assembly for disposition proximate a roof of a vehicle to shield a vehicle occupant from impacting at least one lateral surface of the vehicle, the airbag assembly comprising:
    an inflatable curtain airbag having a stowed configuration proximate the roof of the vehicle and a deployed configuration into which the inflatable curtain airbag deploys downward between the vehicle occupant and the at least one lateral surface of the vehicle, the inflatable curtain airbag comprising an inboard fabric layer and an outboard fabric layer that are secured together at a peripheral juncture to define, interior to the peripheral juncture, the peripheral juncture having a top portion and a bottom portion, the inflatable curtain airbag comprising:
    a first chamber;
    a second chamber in fluid communication with the first chamber, the second chamber comprising a single unbranching passageway comprising:
       an upper segment through which inflation gas enters the second chamber from the first chamber; and
       a lower segment below the upper segment and adjacent to the bottom portion of the peripheral juncture, wherein the lower segment directs the inflation gas back toward the first chamber; and
    a non-inflating region extending from the bottom portion of the peripheral juncture towards the top portion of the peripheral juncture to at least partially separate the first chamber from the second chamber, the non-inflating region having a width selected to permit in-plane bending of the inflatable curtain airbag at the non-inflating region such that the lower segment of the second chamber tilts downward at an angle relative to the first chamber in the deployed configuration.

11. The airbag assembly of claim 10, wherein the inboard fabric layer and the outboard fabric layer are further secured together to define the non-inflating region having an angled portion that extends forward and upward from the bottom portion of the peripheral juncture to at least partially separate the first chamber from the second chamber and a forward portion that separates the upper segment from the lower segment, wherein the single unbranching passageway further comprises a forward segment positioned to convey the inflation gas downward from the upper segment to the lower segment.

12. The airbag assembly of claim 10, wherein due to the in-plane bending of the inflatable curtain airbag the lower segment of the second chamber inflates inboard of a window and extends lower than a bottom of the window.

13. The airbag assembly of claim 10, wherein the inboard fabric layer and the outboard fabric layer are further secured together to define a non-inflating region comprising a generally vertical portion that extends upward from a bottom edge of the peripheral juncture to at least partially separate the first chamber from the second chamber, and a generally horizontal portion that separates the upper segment from the lower segment, the airbag assembly further comprising an attachment feature that attaches a forward portion of the non-inflating region to a rearward portion of the non-inflating region such that a fold is defined between the forward portion and the rearward portion to reduce a width of the non-inflating region.

* * * * *